US012682596B2

(12) United States Patent
Tsogkas et al.

(10) Patent No.: US 12,682,596 B2
(45) Date of Patent: Jul. 14, 2026

(54) EFFICIENT FLOW-GUIDED MULTI-FRAME DE-FENCING

(71) Applicant: SAMSUNG ELECTRONICS CO., LTD., Suwon-si (KR)

(72) Inventors: Stavros Tsogkas, Toronto (CA); Fengjia Zhang, Toronto (CA); Aleksai Levinshtein, Thornhill (CA); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 18/112,822

(22) Filed: Feb. 22, 2023

(65) Prior Publication Data

US 2024/0071035 A1 Feb. 29, 2024

Related U.S. Application Data

(60) Provisional application No. 63/401,472, filed on Aug. 26, 2022.

(51) Int. Cl.
| | |
|---|---|
| *G06V 10/26* | (2022.01) |
| *G06T 5/77* | (2024.01) |

(Continued)

(52) U.S. Cl.
CPC .............. *G06V 10/273* (2022.01); *G06T 5/77* (2024.01); *G06T 7/215* (2017.01); *G06T 7/254* (2017.01);

(Continued)

(58) Field of Classification Search
CPC .. G06V 10/273; G06V 10/7715; G06V 20/46; G06V 10/54; G06V 10/62;

(Continued)

(56) References Cited

U.S. PATENT DOCUMENTS

| | | |
|---|---|---|
| 9,390,532 B2 | 7/2016 | Hyvarinen |
| 10,412,316 B2 | 9/2019 | Rubinstein et al. |

(Continued)

FOREIGN PATENT DOCUMENTS

| | | |
|---|---|---|
| CN | 110992367 A | 4/2020 |
| WO | 2020/088766 A1 | 5/2020 |
| WO | 2022/093283 A1 | 5/2022 |

OTHER PUBLICATIONS

Du, C., Kang, B., Xu, Z., Dai, J. and Nguyen, T., Jul. 2018. Accurate and efficient video de-fencing using convolutional neural networks and temporal information. In 2018 IEEE International Conference on Multimedia and Expo (ICME) (pp. 1-6). IEEE.*

(Continued)

*Primary Examiner* — Zhitong Chen
(74) *Attorney, Agent, or Firm* — Sughrue Mion, PLLC

(57) ABSTRACT

The present disclosure provides methods, apparatuses, and computer-readable mediums for performing multi-frame de-fencing by a device. In some embodiments, a method includes obtaining an image burst having at least one portion of a background scene obstructed by an opaque obstruction. The method further includes generating a plurality of obstruction masks marking the at least one portion of the background scene obstructed by the opaque obstruction in images of the image burst. The method further includes computing a motion of the background scene, with respect to a keyframe selected from the plurality of images, by applying an occlusion-aware optical flow model. The method further includes reconstructing the selected keyframe by providing a combination of features to an image fusion and inpainting network. The method further includes providing, to the user, the reconstructed keyframe comprising an unobstructed version of the background scene of the image burst.

18 Claims, 12 Drawing Sheets

(51) Int. Cl.

| | |
|---|---|
| *G06T 7/215* | (2017.01) |
| *G06T 7/254* | (2017.01) |
| *G06T 7/38* | (2017.01) |
| *G06V 10/77* | (2022.01) |
| *G06V 20/40* | (2022.01) |

(52) U.S. Cl.
CPC ............ *G06T 7/38* (2017.01); *G06V 10/7715* (2022.01); *G06V 20/46* (2022.01); *G06T 2207/20221* (2013.01)

(58) Field of Classification Search
CPC ........ G06V 10/774; G06V 10/82; G06T 5/77; G06T 7/215; G06T 7/254; G06T 7/38; G06T 2207/20221; G06T 2207/10016; G06T 2207/20081; G06T 2207/20084; G06T 2207/30196; G06T 5/50; G06T 5/60
See application file for complete search history.

(56) References Cited

U.S. PATENT DOCUMENTS

| | | | | |
|---|---|---|---|---|
| 2017/0359523 | A1* | 12/2017 | Rubinstein | ................ G06T 5/77 |
| 2019/0138889 | A1 | 5/2019 | Jiang et al. | |
| 2021/0327031 | A1 | 10/2021 | Xie et al. | |
| 2022/0058426 | A1 | 2/2022 | Song et al. | |

OTHER PUBLICATIONS

Liu, Y.L., Lai, W.S., Yang, M.H., Chuang, Y.Y. and Huang, J.B., 2020. Learning to See Through Obstructions with Layered Decomposition. arXiv preprint arXiv:2008.04902.*

Jonna, S., Nakka, K.K. and Sahay, R.R., 2016. Deep learning based fence segmentation and removal from an image using a video sequence. In Computer Vision—ECCV 2016 Workshops: Amsterdam, The Netherlands, Oct. 8-10 and 15-16, 2016, Proceedings , Part III 14 (pp. 836-851). Springer International Publishing.*

Gupta, D., Jain, S., Tripathi, U., Chattopadhyay, p. and Wang, L., 2021. A robust and efficient image de-fencing approach using conditional generative adversarial networks. Signal, Image and Video Processing, 15(2), pp. 297-305.*

Gupta, Divyanshu et al., "A robust and efficient image de-fencing approach using conditional generative adversarial networks", Signal, Image and Video Processing, vol. 15, pp. 297-305, Jul. 30, 2020.

Jonna, Sankaraganesh et al., "My camera can see through fences: A deep learning approach for image de-fencing", 2015 3rd IAPR Asian Conference on Pattern Recognition, IEEE, 2015, pp. 261-265.

International Search Report and Written Opinion issued Jul. 25, 2023 by the International Searching Authority in counterpart International Patent Application No. PCT/KR2023/005282. (ISA/220, ISA/210 and ISA/237).

* cited by examiner

200

(A)

(B)

(C)

400

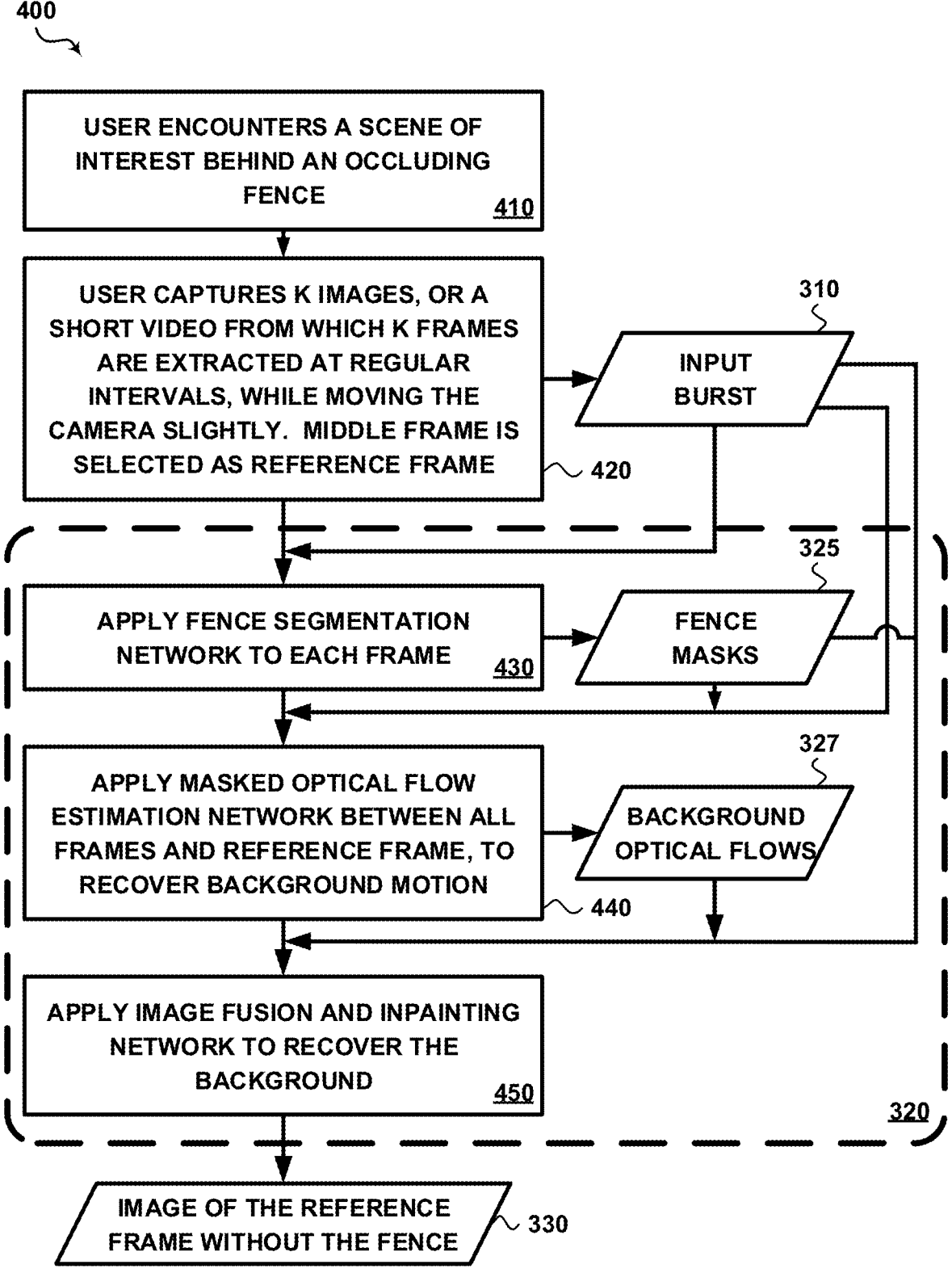

USER ENCOUNTERS A SCENE OF INTEREST BEHIND AN OCCLUDING FENCE    410

USER CAPTURES K IMAGES, OR A SHORT VIDEO FROM WHICH K FRAMES ARE EXTRACTED AT REGULAR INTERVALS, WHILE MOVING THE CAMERA SLIGHTLY. MIDDLE FRAME IS SELECTED AS REFERENCE FRAME    420

INPUT BURST    310

APPLY FENCE SEGMENTATION NETWORK TO EACH FRAME    430

FENCE MASKS    325

APPLY MASKED OPTICAL FLOW ESTIMATION NETWORK BETWEEN ALL FRAMES AND REFERENCE FRAME, TO RECOVER BACKGROUND MOTION    440

BACKGROUND OPTICAL FLOWS    327

APPLY IMAGE FUSION AND INPAINTING NETWORK TO RECOVER THE BACKGROUND    450

320

IMAGE OF THE REFERENCE FRAME WITHOUT THE FENCE    330

CREATE A DATASET OF SYNTHETIC FENCE BURSTS BY OVERLAYING FENCES OF CLEAN BACKGROUNDS ~ 510

TRAIN FENCE SEGMENTATION NETWORK ~ 520

TRAIN MASKED FLOW ESTIMATION NETWORK ~ 530

TRAIN IMAGE FUSION AND INPAINTING NETWORK ~ 540

1100

OBTAINING, FROM A USER OF THE DEVICE, AN IMAGE BURST COMPRISING A PLURALITY OF IMAGES, WHEREIN EACH IMAGE OF THE PLURALITY OF IMAGES HAS AT LEAST ONE PORTION OF A BACKGROUND SCENE OBSTRUCTED BY AN OPAQUE OBSTRUCTION ⟶ 1110

GENERATING, FOR EACH IMAGE OF THE IMAGE BURST, AN OBSTRUCTION MASK CORRESPONDING TO THAT IMAGE BY APPLYING AN OBSTRUCTION SEGMENTATION MODEL TO THAT IMAGE, RESULTING IN A PLURALITY OF OBSTRUCTION MASKS CORRESPONDING TO THE PLURALITY OF IMAGES, THE PLURALITY OF OBSTRUCTION MASKS MARKING THE AT LEAST ONE PORTION OF THE BACKGROUND SCENE OBSTRUCTED BY THE OPAQUE OBSTRUCTION IN THE PLURALITY OF IMAGES ⟶ 1120

COMPUTING A MOTION OF THE BACKGROUND SCENE, WITH RESPECT TO A KEYFRAME SELECTED FROM THE PLURALITY OF IMAGES, BY APPLYING AN OCCLUSION-AWARE OPTICAL FLOW MODEL, CONDITIONED USING THE PLURALITY OF OBSTRUCTION MASKS, TO FRAME-KEYFRAME PAIRS OF THE IMAGE BURST, EACH PAIR OF THE FRAME-KEYFRAME PAIRS COMPRISING THE KEYFRAME AND A REMAINING IMAGE OF THE PLURALITY OF IMAGES ⟶ 1130

RECONSTRUCTING THE SELECTED KEYFRAME BY PROVIDING A COMBINATION OF FEATURES TO AN IMAGE FUSION AND INPAINTING NETWORK, THE FEATURES COMPRISING THE PLURALITY OF IMAGES AND THE PLURALITY OF OBSTRUCTION MASKS ALIGNED ACCORDING TO THE MOTION OF THE BACKGROUND SCENE, AND OPTICAL FLOW MAPS GENERATED BY THE OCCLUSION-AWARE OPTICAL FLOW MODEL     1140

PROVIDING, TO THE USER, THE RECONSTRUCTED KEYFRAME COMPRISING AN UNOBSTRUCTED VERSION OF THE BACKGROUND SCENE OF THE IMAGE BURST     1150

FIG. 11B

EFFICIENT FLOW-GUIDED MULTI-FRAME DE-FENCING

CROSS-REFERENCE TO RELATED APPLICATIONS

This application claims benefit of priority under 35 U.S.C. § 119 to U.S. Provisional Patent Application No. 63/401,472, filed on Aug. 26, 2022, in the U.S. Patent and Trademark Office, the disclosure of which is incorporated by reference herein in its entirety.

BACKGROUND

1. Field

The present disclosure relates generally to image processing, and more particularly to methods, apparatuses, and non-transitory computer-readable mediums for performing multi-frame de-fencing by a device.

2. Description of Related Art

Rapid improvements in both camera hardware and image processing software have turned modern mobile devices (e.g., smartphones, cellular phones, tablets, digital cameras, personal digital assistants (PDA), wearable devices) into powerful yet portable image and/or video recording devices. This combination of high image quality and portability has enabled and encouraged casual users to shoot photos without any time for special preparation, setup, and/or framing of the shot. As a result, photos and/or videos taken under these conditions may contain objects of interest that may be hindered by various obstructions that stand between the subject and the user. For example, the objects of interest may be obstructed by a fence, such as, but not limited to, when taking a photo and/or video of an animal through a zoo fence, a pet bird in its cage, and people playing basketball in a fenced-out outdoor court. These are just a few examples of everyday scenes that may be obstructed by fence structures and the like that may be inconvenient and/or difficult to avoid.

De-fencing may refer to using computer vision algorithms that may automatically remove such obstructions from images. A de-fencing process may be a more difficult problem than it may initially seem. For example, obstructions (e.g., fences) may have varying structure and/or appearance patterns, and may come in different thicknesses and/or sizes. Furthermore, reconstruction of the background scene may become challenging because of low lighting, noise, and/or rapidly moving objects, which may cause motion blur.

Thus, there exists a need for further improvements to de-fencing technologies. Improvements are presented herein. These improvements may also be applicable to other image obstruction removal technologies and/or other image processing technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing multi-frame de-fencing by a device are disclosed by the present disclosure.

According to an aspect of the present disclosure, a method of performing multi-frame de-fencing by a device is provided. The method includes obtaining, from a user of the device, an image burst including a plurality of images. Each image of the plurality of images has at least one portion of a background scene obstructed by an opaque obstruction. The method further includes generating, for each image of the image burst, an obstruction mask corresponding to that image by applying an obstruction segmentation model to that image, resulting in a plurality of obstruction masks corresponding to the plurality of images. The plurality of obstruction masks mark the at least one portion of the background scene obstructed by the opaque obstruction in the plurality of images. The method further includes computing a motion of the background scene, with respect to a keyframe selected from the plurality of images, by applying an occlusion-aware optical flow model, conditioned using the plurality of obstruction masks, to frame-keyframe pairs of the image burst. Each pair of the frame-keyframe pairs include the keyframe and a remaining image of the plurality of images. The method further includes reconstructing the selected keyframe by providing a combination of features to an image fusion and inpainting network. The features include the plurality of images and the plurality of obstruction masks aligned according to the motion of the background scene, optical flow maps generated by the occlusion-aware optical flow model, and binary masks indicating valid regions of the plurality of images. The method further includes providing, to the user, the reconstructed keyframe that includes an unobstructed version of the background scene of the image burst.

In some embodiments, the method may include detecting the opaque obstruction on at least one image of the image burst. The opaque obstruction may include a structure having a thickness less than a predetermined threshold.

In some embodiments, the structure may have a repeating pattern across the at least one image of the image burst.

In some embodiments, the obtaining of the image burst may include obtaining the plurality of images having been sequentially captured, by an image capturing apparatus, during a predetermined time period. The image capturing apparatus may have been moved by the user during the predetermined time period.

In some embodiments, the obtaining of the image burst may include extracting the plurality of images from a video captured, by a video capturing apparatus, during a predetermined time period. The video capturing apparatus may have been moved by the user during the predetermined time period.

In some embodiments, the generating, for that image of the image burst, of the obstruction mask may include performing, using the obstruction segmentation model, one or more down-sampling operations on that image of the image burst resulting in a down-sampled image. Each of the one or more down-sampling operations may successively reduce a number of pixels of that image and may increase a number of feature channels of that image. The generating may further include performing, using the obstruction segmentation model, one or more up-sampling operations on the down-sampled image resulting in an output image. Each of the one or more up-sampling operations may successively increase a number of pixels of the down-sampled image and may decrease a number of feature channels of the down-sampled image. The generating may further include generating the obstruction mask for that image of the image burst by applying a sigmoid function to the output image of the obstruction segmentation model.

In some embodiments, the method may include computing, using the occlusion-aware optical flow model, an optical flow map for each of the frame-keyframe pairs. Each optical flow map may correspond to the background scene of each of the frame-keyframe pairs.

In some embodiments, the reconstructing of the selected keyframe may include masking out obstructed areas of the plurality of images using the plurality of obstruction masks, resulting in masked images. The reconstructing may further include aligning, with respect to the selected keyframe, the masked images and the plurality of obstruction masks, according to the optical flow maps. The reconstructing may further include computing the binary masks indicating the valid regions of the plurality of images. The reconstructing may further include concatenating the aligned masked images, the aligned plurality of obstruction masks, the optical flow maps, and the binary masks, resulting in the combination of the features provided to the image fusion and inpainting network.

In some embodiments, the method may include creating a dataset of synthetic obstructed image bursts by overlaying opaque obstructions on images of background scenes. The method may further include training the obstruction segmentation model with at least one portion of the dataset. The method may further include training the occlusion-aware optical flow model with the at least one portion of the dataset and corresponding obstruction masks generated by the obstruction segmentation model. The method may further include training the image fusion and inpainting network with the at least one portion of the dataset, the corresponding obstruction masks generated by the obstruction segmentation model, and corresponding optical flow maps computed by the occlusion-aware optical flow model.

In some embodiments, the creating of the dataset may include applying one or more degrees of downscaling to the synthetic obstructed image bursts and adding the down-scaled synthetic obstructed image bursts to the dataset. The creating may further include randomly flipping one or more of the synthetic obstructed image bursts and adding the flipped synthetic obstructed image bursts to the dataset. The creating may further include randomly cropping one or more of the synthetic obstructed image bursts to a predetermined size and adding the cropped synthetic obstructed image bursts to the dataset.

In some embodiments, the training of the occlusion-aware optical flow model may include applying the occlusion-aware optical flow model, conditioned using the corresponding obstruction masks, to the at least one portion of the dataset to compute the corresponding optical flow maps. The training may further include applying an optical flow model to corresponding images of the background scenes, which correspond to the at least one portion of the dataset, to compute background optical flow maps. The training may further include training the occlusion-aware optical flow model based on a comparison between the background optical flow maps and the corresponding optical flow maps.

According to an aspect of the present disclosure, an apparatus for performing multi-frame de-fencing by a device is provided. The apparatus includes a memory storage storing computer-executable instructions, and a processor communicatively coupled to the memory storage. The processor is configured to execute the computer-executable instructions and cause the apparatus to obtain, from a user of the apparatus, an image burst including a plurality of images. Each image of the plurality of images has at least one portion of a background scene obstructed by an opaque obstruction. The processor is further configured to execute further computer-executable instructions and further cause the apparatus to generate, for each image of the image burst, an obstruction mask corresponding to that image by applying an obstruction segmentation model to that image, resulting in a plurality of obstruction masks corresponding to the plurality of images. The plurality of obstruction masks mark the at least one portion of the background scene obstructed by the opaque obstruction in the plurality of images. The processor is further configured to execute further computer-executable instructions and further cause the apparatus to compute a motion of the background scene, with respect to a keyframe selected from the plurality of images, by applying an occlusion-aware optical flow model, conditioned using the plurality of obstruction masks, to frame-keyframe pairs of the image burst. Each pair of the frame-keyframe pairs include the keyframe and a remaining image of the plurality of images. The processor is further configured to execute further computer-executable instructions and further cause the apparatus to reconstruct the selected keyframe by providing a combination of features to an image fusion and inpainting network. The features include the plurality of images and the plurality of obstruction masks aligned according to the motion of the background scene, optical flow maps generated by the occlusion-aware optical flow model, and binary masks indicating valid regions of the plurality of images. The processor is further configured to execute further computer-executable instructions and further cause the apparatus to provide, to the user, the reconstructed keyframe including an unobstructed version of the background scene of the image burst.

In some embodiments, the processor may be further configured to execute further computer-executable instructions and may further cause the apparatus to detect the opaque obstruction on at least one image of the image burst. The opaque obstruction may include a structure having a thickness less than a predetermined threshold. The structure may have a repeating pattern across the at least one image of the image burst.

In some embodiments, the processor may be further configured to execute further computer-executable instructions and may further cause the apparatus to perform, using the obstruction segmentation model, one or more down-sampling operations on that image of the image burst resulting in a down-sampled image. Each of the one or more down-sampling operations successively reduce a number of pixels of that image and increase a number of feature channels of that image. The processor may further cause the apparatus to perform, using the obstruction segmentation model, one or more up-sampling operations on the down-sampled image resulting in an output image. Each of the one or more up-sampling operations successively increase a number of pixels of the down-sampled image and decrease a number of feature channels of the down-sampled image. The processor may further cause the apparatus to generate the obstruction mask for that image of the image burst by applying a sigmoid function to the output image of the obstruction segmentation model.

In some embodiments, the processor may be further configured to execute further computer-executable instructions and may further cause the apparatus to compute, using the occlusion-aware optical flow model, an optical flow map for each of the frame-keyframe pairs. Each optical flow map may correspond to the background scene of each of the frame-keyframe pairs.

In some embodiments, the processor may be further configured to execute further computer-executable instructions and may further cause the apparatus to mask out obstructed areas of the plurality of images using the plurality of obstruction masks, resulting in masked images. The processor may further cause the apparatus to align, with respect to the selected keyframe, the masked images and the plurality of obstruction masks, according to the optical flow maps. The processor may further cause the apparatus to compute the binary masks indicating the valid regions of the plurality of images. The processor may further cause the apparatus to concatenate the aligned masked images, the aligned plurality of obstruction masks, the optical flow maps, and the binary masks, resulting in the combination of the features provided to the image fusion and inpainting network.

In some embodiments, the processor may be further configured to execute further computer-executable instructions and may further cause the apparatus to create a dataset of synthetic obstructed image bursts by overlaying opaque obstructions on images of background scenes. The processor may further cause the apparatus to train the obstruction segmentation model with at least one portion of the dataset. The processor may further cause the apparatus to train the occlusion-aware optical flow model with the at least one portion of the dataset and corresponding obstruction masks generated by the obstruction segmentation model. The processor may further cause the apparatus to train the image fusion and inpainting network with the at least one portion of the dataset, the corresponding obstruction masks generated by the obstruction segmentation model, and corresponding optical flow maps computed by the occlusion-aware optical flow model.

In some embodiments, the processor may be further configured to execute further computer-executable instructions and may further cause the apparatus to apply one or more degrees of downscaling to the synthetic obstructed image bursts and to add the downscaled synthetic obstructed image bursts to the dataset. The processor may further cause the apparatus to randomly flip one or more of the synthetic obstructed image bursts and to add the flipped synthetic obstructed image bursts to the dataset. The processor may further cause the apparatus to randomly crop one or more of the synthetic obstructed image bursts to a predetermined size and to add the cropped synthetic obstructed image bursts to the dataset.

According to an aspect of the present disclosure, a non-transitory computer-readable storage medium storing computer-executable instructions for performing multi-frame de-fencing by a device is provided. The computer-executable instructions are configured, when executed by one or more processors of the device, to cause the device to obtain, from a user of the device, an image burst including a plurality of images. Each image of the plurality of images has at least one portion of a background scene obstructed by an opaque obstruction. The computer-executable instructions are further configured, when executed by the one or more processors of the device, to further cause the device to generate, for each image of the image burst, an obstruction mask corresponding to that image by applying an obstruction segmentation model to that image, resulting in a plurality of obstruction masks corresponding to the plurality of images. The plurality of obstruction masks mark the at least one portion of the background scene obstructed by the opaque obstruction in the plurality of images. The computer-executable instructions are further configured, when executed by the one or more processors of the device, to further cause the device to compute a motion of the background scene, with respect to a keyframe selected from the plurality of images, by applying an occlusion-aware optical flow model, conditioned using the plurality of obstruction masks, to frame-keyframe pairs of the image burst. Each pair of the frame-keyframe pairs includes the keyframe and a remaining image of the plurality of images. The computer-executable instructions are further configured, when executed by the one or more processors of the device, to further cause the device to reconstruct the selected keyframe by providing a combination of features to an image fusion and inpainting network. The features include the plurality of images and the plurality of obstruction masks aligned according to the motion of the background scene, optical flow maps generated by the occlusion-aware optical flow model, and binary masks indicating valid regions of the plurality of images. The computer-executable instructions are further configured, when executed by the one or more processors of the device, to further cause the device to provide, to the user, the reconstructed keyframe including an unobstructed version of the background scene of the image burst.

In some embodiments, the computer-executable instructions may be further configured, when executed by the one or more processors of the device, to further cause the device to mask out obstructed areas of the plurality of images using the plurality of obstruction masks, resulting in masked images. The computer-executable instructions may further cause the device to align, with respect to the selected keyframe, the masked images and the plurality of obstruction masks, according to the optical flow maps. The computer-executable instructions may further cause the device to compute binary masks that indicate valid regions of the plurality of images. The computer-executable instructions may further cause the device to concatenate the aligned masked images, the aligned plurality of obstruction masks, the optical flow maps, and the binary masks, resulting in the combination of the features provided to the image fusion and inpainting network.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 depicts an example of a process flow for performing multi-frame de-fencing by a device during test time, in accordance with various aspects of the present disclosure;

FIGS. 11A and 11B depict a flowchart of an example method of performing multi-frame de-fencing to be performed by a device, in accordance with various aspects of the present disclosure.

DETAILED DESCRIPTION

Figure 1:
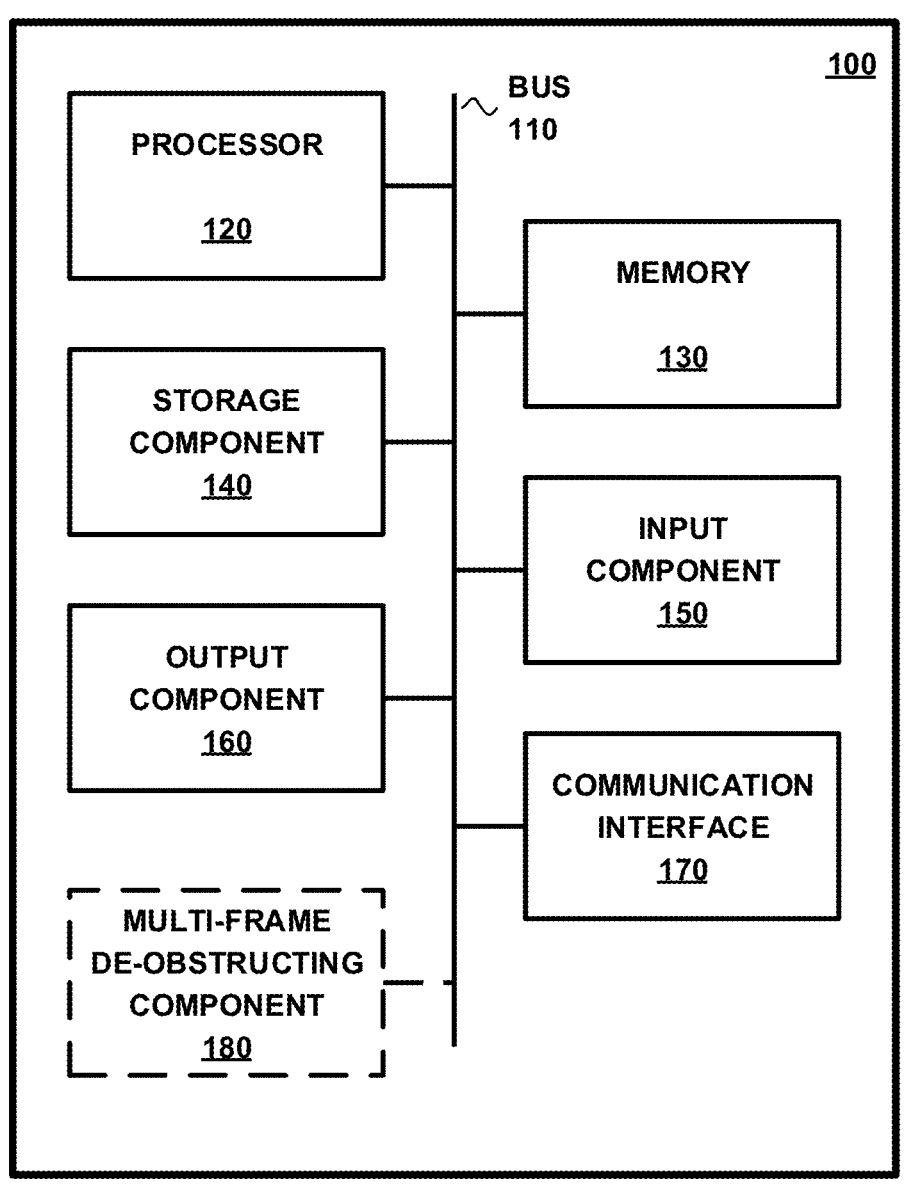
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

As a general introduction to the subject matter described in more detail below, aspects described herein are directed towards apparatuses, methods, and non-transitory computer-readable mediums for performing multi-frame de-fencing by a device. Aspects described herein may be used to reconstruct a background scene from an image burst in which the background scene may be obstructed by an opaque obstruction.

Taking photographs and/or videos using mobile devices (e.g., smartphones, cellular phones, tablets, digital cameras, personal digital assistants (PDA), wearable devices) under natural and/or free conditions (e.g., "in-the-wild") may result in images that may be hindered by obstructions (e.g., fences) that may stand between the user and the scene of interest. In some scenarios, the obstructions may be difficult and/or inconvenient to avoid. For example, when taking a photo and/or video of an animal through a zoo fence, a pet bird in its cage, and people playing basketball in a fenced-out outdoor court.

De-fencing may refer to an algorithmic process of automatically removing such obstructions from images, and reconstructing the occluded (e.g., obstructed) parts of the background scene. That is, de-fencing may be formulated as the segmentation of a repeating foreground pattern that exhibits approximate translational symmetry, followed by inpainting to recover the occluded image regions. Because of the opaque nature of the obstruction, the occluded parts of the background scene may need to be hallucinated by the inpainting algorithm.

While de-fencing may be formulated as a combination of segmentation and image inpainting, such a formulation may lead to implausible hallucinations (e.g., reconstructions, replacements) of the occluded regions. For example, related multi-frame approaches to de-fencing may rely on propagating information to a selected keyframe of the image burst from temporally neighboring images. However, such approaches may prove inefficient and/or be unable to properly align obstructed images.

In aspects described herein, the present disclosure provides apparatuses, methods, and non-transitory computer-readable mediums for performing multi-frame de-fencing by a device. That is, the present disclosure provides a framework for multi-frame de-fencing that may compute high quality flow maps directly from obstructed frames, and may use them to accurately align frames. In some aspects, the framework may comprise a convolutional neural network (CNN) architecture for multi-frame de-fencing that consists of a small number of trainable independent components. Such components may include a segmentation-aware optical flow model and a frame fusion and inpainting module. The segmentation-aware optical flow model may estimate flows corresponding to the background scene despite severe obstructions. The frame fusion and inpainting module may output a single clean background image based on the image burst, computed foreground masks, and the estimated flows.

The aspects described herein provide several advantages over related multi-frame approaches to de-fencing by requiring only a short image burst as an input without sequence-specific fine tuning. That is, an assumption that the occlusion is known may not be made, and the occlusion may be automatically estimated from the input image burst. Alternatively or additionally, multiple CNN modules, which may be trained using generated synthetic data, may be leveraged, resulting in an architecture that may provide more accurate results in a shorter amount of time (e.g., real time) and with a lower memory footprint, when compared to related multi-frame approaches to de-fencing.

As noted above, certain embodiments are discussed herein that relate to performing multi-frame de-fencing by a device. Before discussing these concepts in further detail, however, an example of a computing device that may be used in implementing and/or otherwise providing various aspects of the present disclosure will first be discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or comprise a desktop computer, a computer server, a mobile device (e.g., a laptop computer, a tablet computer, a smart phone, any other type of mobile computing device, etc.), and/or any other type of data processing device.

For example, the device 100 may comprise a processor, a personal computer (PC), a printed circuit board (PCB) comprising a computing device, a mini-computer, a main-frame computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, the device 100 may comprise a set of components, such as a processor 120, a memory 130, a storage component 140, an input component 150, an output component 160, a communication interface 170, and a multi-frame de-obstructing component 180. The set of components of the device 100 may be communicatively coupled via a bus 110.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The present disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a neural processing unit (NPU), an AI-dedicated processor designed to have a hardware structure specified to process an AI model, a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170, the multi-frame de-obstructing component 180).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may comprise a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may comprise one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may comprise a sensor for sensing information (e.g., a global positioning system (GPS) component, an accelerometer, a gyroscope, an actuator, and the like).

The output component 160 of device 100 may comprise one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may comprise a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth, ZigBee, Wi-Fi, LTE, 5G, and the like. In other embodiments, the communication interface 170 may comprise an Ethernet interface, an optical interface, a coaxial interface, an infrared interface, a radio frequency (RF) interface, or the like.

In some embodiments, the device 100 may comprise the multi-frame de-obstructing component 180, which may be configured to perform multi-frame de-fencing by a device. For example, the multi-frame de-obstructing component 180 may be configured to obtain an image burst from an user, generate a plurality of obstruction masks, compute a motion of the background scene, reconstruct the selected keyframe, and provide the reconstructed keyframe to the user.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may comprise memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to performing multi-frame de-fencing by a device.

Figure 2:
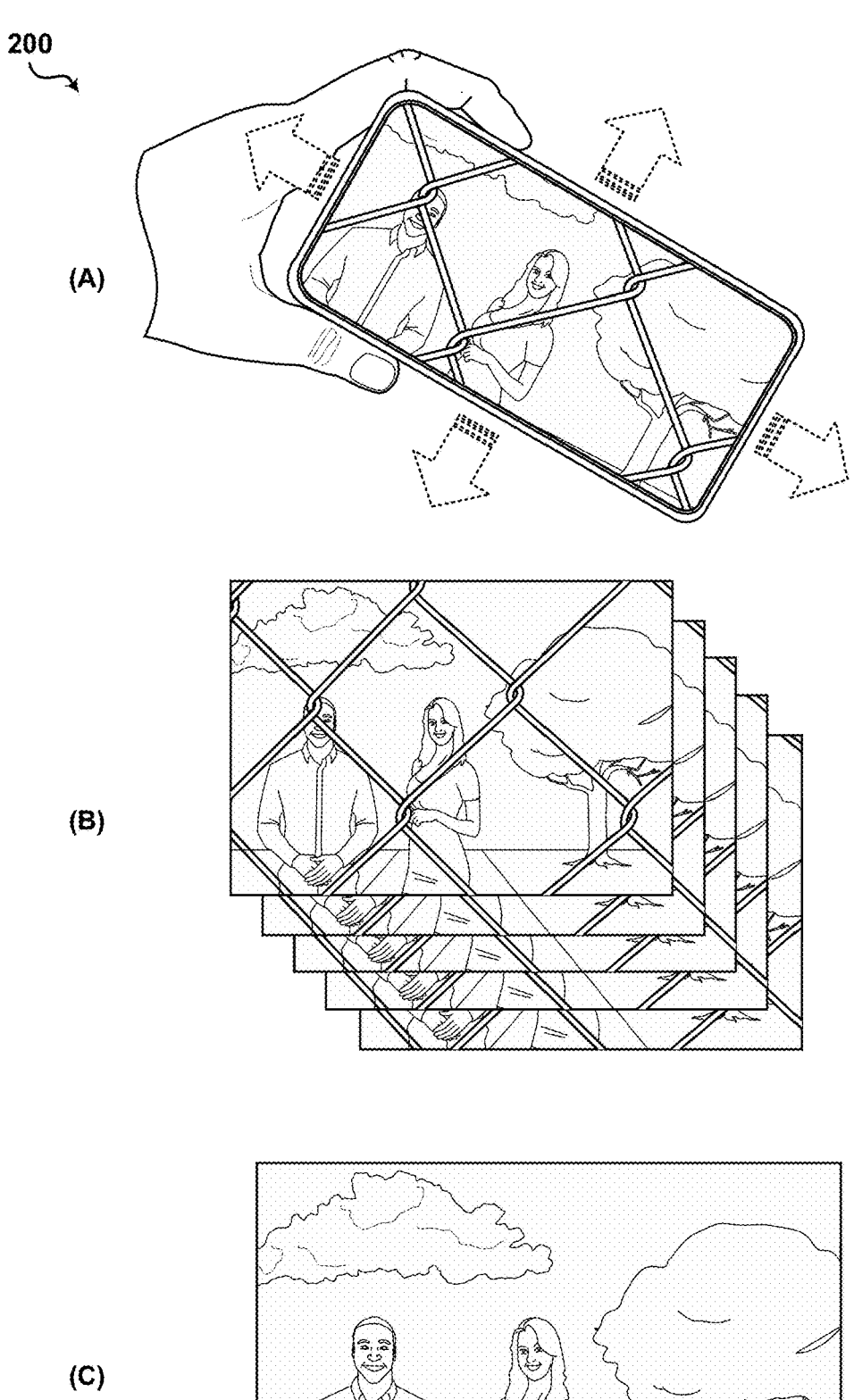
FIG. 2 illustrates an example of performing multi-frame de-fencing by a device, in accordance with various aspects of the present disclosure.

FIG. 2 illustrates an example of performing multi-frame de-fencing by a device, in accordance with various aspects of the present disclosure. The multi-frame de-fencing process 200 of FIG. 2 may include an artificial-intelligence (AI)-based de-fencing process of an image where a fence is occluding the background of interest.

In some embodiments, at least a portion of the multi-frame de-fencing process 200 may be performed by the device 100 of FIG. 1, which may include the multi-frame de-obstructing component 180. Alternatively or additionally, another computing device (e.g., a server, a laptop, a smartphone, a user equipment (UE), a wearable device, etc.) that includes the multi-frame de-obstructing component 180 may perform at least a portion of the multi-frame de-fencing process 200.

As shown in (A) and (B) of FIG. 2, a user may capture a small burst of images, using a mobile device (e.g., a smartphone, a cellular phone, a tablet, a digital camera, a PDA, a wearable device) that may contain an image capturing apparatus (e.g., a still camera, a video camera). The small burst of images may have at least one portion of a background scene obstructed by an opaque obstruction (e.g., fence). According to various aspects of the present disclosure, the multi-frame de-fencing process 200 may include detecting and removing the obstruction automatically (without any user interaction), and return a clean image of the background behind the obstruction, as shown in (C) of FIG. 2. For example, in some embodiments, the multi-frame de-fencing process 200 may align the unoccluded portions of each image and fuse the results into a single image.

As discussed above, de-fencing may refer to an algorithmic process of automatically removing obstructions from images, and reconstructing the occluded (e.g., obstructed) parts of the background scene. As such, de-fencing may be viewed as a particular case of a more general problem of layer separation, which may assume that an image is formed as a composition of individual layers. For example, an image may be composed of a foreground layer containing the obstruction (e.g., a wire fence) and a background layer containing the scene of interest (e.g., a city skyline), as shown in (A) of FIG. 2.

Typically, the obstruction (e.g., the foreground layer) may be located much closer to the user (e.g., a lens of the image capturing apparatus) than the scene of interest (e.g., the background layer). As a result, even small movements of the image capturing apparatus may result in a displacement that may be sufficient to reveal portions (e.g., pixels) of the scene of interest that may be occluded in previous frames of the image burst. That is, the user may introduce motion into the image burst via involuntary and/or voluntary hand movements. These hand movements may lead to displacements that may make some portions that may be occluded in one frame of the image burst to be visible (e.g., not occluded) in another frame of the image burst.

For example, the user may introduce motion into the image burst via involuntary handshakes even if the user is attempting to stay still, as shown by the up/down arrows in (A) of FIG. 2. Alternatively or additionally, if the user is taking a video, from which the image burst is taken, then the user may naturally and/or voluntarily move the image capturing apparatus and capture video frames of the scene of interest from slightly different viewpoints, thus making most portions of the scene of interest visible in at least one image of the image burst. In some optional or additional embodiments, the user may be prompted to move the image capturing apparatus (e.g., a mobile device containing the image capturing apparatus) to capture images from different viewpoints to obtain more image frames to assist in obstruction removal.

In addition to the displacements introduced into the image burst by the motion of the user, the motion may cause a motion parallax effect in the image burst. That is, since the obstruction plane (e.g., the foreground layer) may typically be much closer to the user than the background objects (e.g., the background layer), the motion in the image burst may cause the foreground layer to be detected as moving faster than the background layer, which may lead to a detected difference between the motion of the foreground layer and the motion of the background layer. In some embodiments, the multi-frame de-fencing process 200 may use the motion parallax effect to distinguish between the foreground layer and the background layer.

Although the present disclosure mostly concentrates on one particular type of obstruction (e.g., fences) because of its commonness, other types of opaque obstructions may be removed from the images. The present disclosure is not limited in this regard. Preferably, the other types of obstructions may include other opaque (e.g., non-reflective, non-transparent) occlusions that may be detectable (e.g., segmentable) in at least one image of the input image burst and that may repeat in a pattern across the input images. That is, the obstruction pattern may repeat across the width (e.g., horizontal axis) and/or height (e.g., vertical axis) of the input images. Alternatively or additionally, the other types of obstructions may include occlusions that are relatively thin (e.g., small width, height, and/or thickness) in relation to the surface area of the input images (e.g., a wire fence as shown in FIG. 2). That is, the occlusions may be preferably thin enough such that there is a high probability that the motion of the user motion as described above is sufficient to allow for a significant portion of the background area to be visible in at least one image of the image burst. In some embodiments, the occlusions may comprise a structure having a thickness less than a predetermined thickness threshold.

In some embodiments, the multi-frame de-fencing process 200 may be performed by a flow-guided multi-frame de-fencing model configured and/or trained for removing obstructions (e.g., fences) from images and reconstructing an underlying (e.g., background) scene of interest. The flow-guided multi-frame de-fencing model may remove obstructions of varying sizes and/or appearances from burst images, without online fine tuning. The type of occlusion may be known (e.g., fences), however, assumptions regarding the spatial extent and/or location of the occlusions may not be made. Instead, the flow-guided multi-frame de-fencing model may comprise a class-specific segmentation model that may be trained to automatically detect obstructions (e.g., fences) in images. Alternatively or additionally, the flow-guided multi-frame de-fencing model may comprise a segmentation-aware spatial pyramid network that may compute flow maps that correspond to the occluded background scenes that are conditioned using the automatically detected obstructions. In other optional or additional embodiments, the flow-guided multi-frame de-fencing model may include an image fusion and inpainting stage that outputs the clean image of the background behind the obstruction.

Having discussed an example process that may be used to perform multi-frame de-fencing by a device, a number of embodiments are now discussed in further detail with reference to FIGS. 3-9. In particular, and as introduced above, some aspects of the present disclosure generally relate to performing multi-frame de-fencing by a device.

Figure 3:
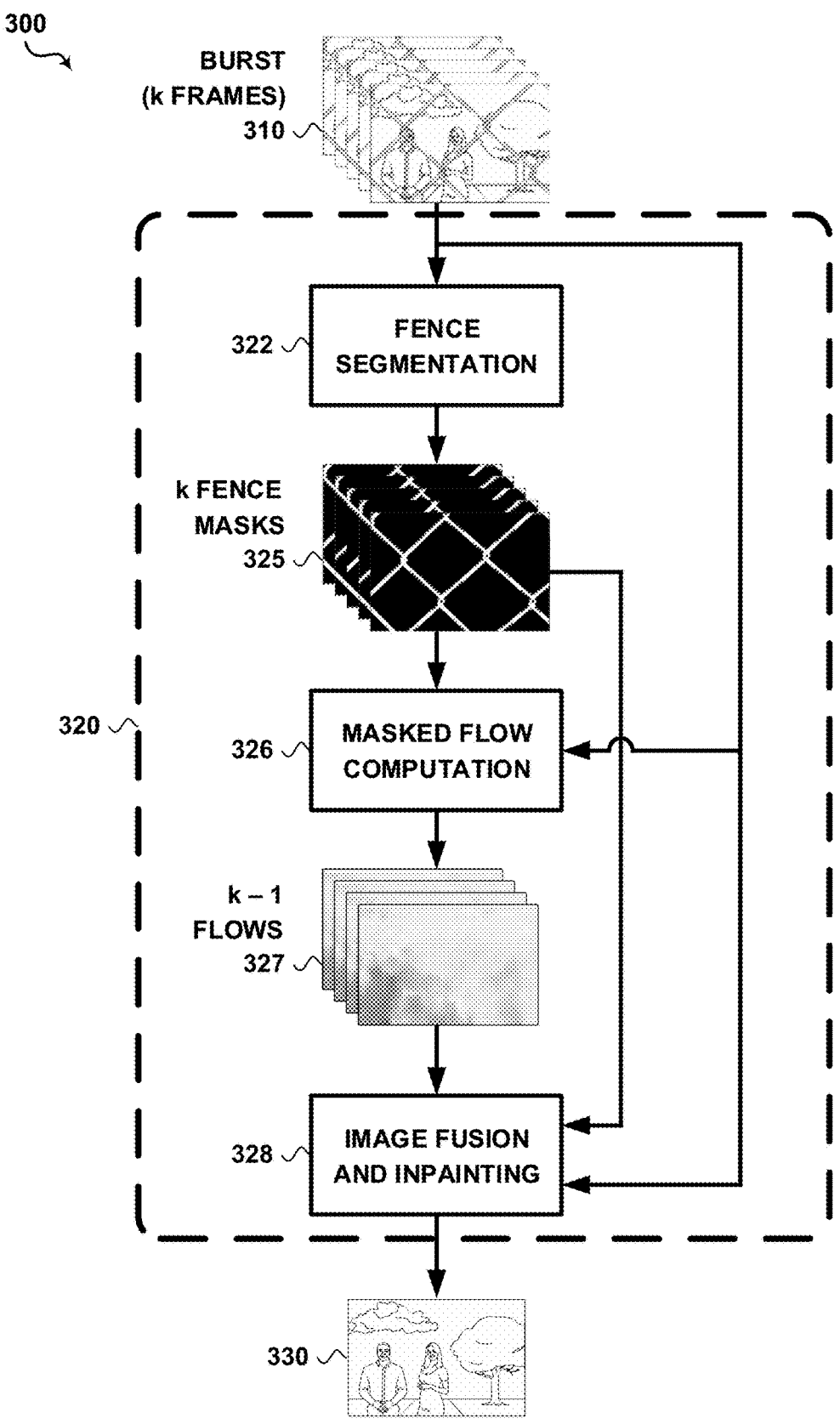
FIG. 3 depicts an example of a block diagram for performing multi-frame de-fencing by a device, in accordance with various aspects of the present disclosure.

FIG. 3 depicts an example of a block diagram for performing multi-frame de-fencing by a device, in accordance with various aspects of the present disclosure.

Referring to FIG. 3, a block diagram 300 for performing multi-frame de-fencing by a device that implements one or more aspects of the disclosure is illustrated. In some embodiments, at least a portion of the operations and/or functions depicted by the block diagram 300 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the block diagram 300.

In some embodiments, the block diagram 300 depicted in FIG. 3 may be used to implement the multi-frame de-fencing process 200 described with reference to FIG. 2 and may include additional features not mentioned above.

Referring to FIG. 3, an input image burst 310 may be provided to the multi-frame de-fencing model 320 as input. In some embodiments, the input image burst 310 may comprise K images, $\{I_i\}$, where K is an integer greater than 1. For example, K may be equal to 5 (e.g., input image burst consists of 5 images), as such a data modality may be available in related mobile devices (e.g., smartphones). However, the present disclosure is not limited in this regard. That is, the input image burst 310 may comprise more images or fewer images than 5 images.

The input image burst 310 may be composed from an unknown background scene of interest $\{B_i\}$ and an unknown opaque foreground occlusion $\{F_i\}$. For example, the input image burst $\{I_i\}$ 310 may be represented with an equation similar to Equation 1.

$$I_i = S_i \times F_i + (1 - S_i) \times B_i \qquad [\text{Eq. 1}]$$

Referring to Equation 1, $\{S_i\}$ represents an occlusion mask, where $S_i \in [0, 1]$, and i represents the index of the image in the input image burst $\{I_i\}$ 310, where $i \in [1, \ldots, K]$. Thus, the multi-frame de-fencing model 320 may be configured and/or trained to remove the foreground occlusion $\{F_i\}$ from the input image burst $\{I_i\}$ 310 and reconstruct a single keyframe background image $\tilde{B}_k$, where k is the index of the keyframe image selected from input image burst $\{I_i\}$ 310.

The keyframe image may be selected from input image burst 310 according to one of many selection methods. For example, a middle image in the input image burst 310 may be selected as the keyframe image. For another example, the first image in the input image burst 310 may be selected as the keyframe image. For another example, the last image in the input image burst 310 may be selected as the keyframe image. For another example, a random (e.g., arbitrary) image in the input image burst 310 may be selected as the keyframe image. The present disclosure is not limited in this regard.

In some embodiments, the images in the input image burst 310 may be RGB (e.g., color) images. In optional or additional embodiments, the images in the input image burst 310 may be black-and-white images. In other optional or additional embodiments, the images in the input image burst 310 may have been extracted from a video (e.g., a sequence of video images). The present disclosure is not limited in this regard.

The input image burst 310 may be obtained by sequentially capturing a plurality of images (having K images) during a predetermined time period using an image capturing apparatus of a mobile device (not shown). Alternatively or additionally, the input image burst 310 may be obtained by extracting a plurality of images (having K images) from a video that may have been captured by a video capturing apparatus. The extracted plurality of images may span a predetermined time period. As discussed above with reference to FIG. 2, the user may have involuntarily and/or voluntarily moved the image capturing apparatus and/or the video capturing apparatus during the predetermined time period that the input image burst 310 has been captured. As such, a significant portion of the background area may be visible in at least one image of the input image burst 310.

Continuing to refer to FIG. 3, the multi-frame de-fencing model 320 may apply each image of the input image burst $\{I_i\}$ 310 to a fence segmentation model 322. The fence segmentation model 322 may be configured and/or trained to output fence segmentation predictions of the foreground occlusion $\{F_i\}$. That is, the fence segmentation model 322 may output K fence masks $\{S_i\}$ 325, as described in detail with reference to FIG. 6. The fence segmentation predictions (e.g., fence masks 325) may be used by the multi-frame de-fencing model 320 to mark the occluded areas in the input image burst 310 that may need to be reconstructed and/or recovered. Alternatively or additionally, the multi-frame de-fencing model 320 may use the fence masks 325 to condition a segmentation-aware optical flow model 326 that may be configured and/or trained to compute K−1 optical flows 327 corresponding to the background scene of interest $\{B_i\}$ only. The segmentation-aware optical flow model 326 may compute the optical flows 327 using the input image burst 310 and the fence masks 325. As described in detail with reference to FIGS. 7 and 8, the segmentation-aware optical flow model 326 may extract K−1 optical flows $\{f_{kj}\}$ 327 between the keyframe $I_k$ and each remaining frame (e.g., image) $I_j$ of the input image burst $\{I_i\}$ 310.

In some embodiments, the multi-frame de-fencing model 320 may use an image fusion and inpainting model 328 to reconstruct and/or recover the portions of the keyframe that may be occluded to yield the single keyframe background image $\hat{B}_k$ 330. For example, the multi-frame de-fencing model 320 may provide the image fusion and inpainting model 328 with the input image burst $\{I_i\}$ 310, the fence masks $\{S_i\}$ 325, and the optical flows $\{f_{kj}\}$ 327, and the image fusion and inpainting model 328 may use these inputs to compute a residual image, that when added to a masked keyframe image, may produce the single keyframe background image $\hat{B}_k$ 330. The image fusion and inpainting model 328 is described in detail with reference to FIG. 9.

Figure 5:
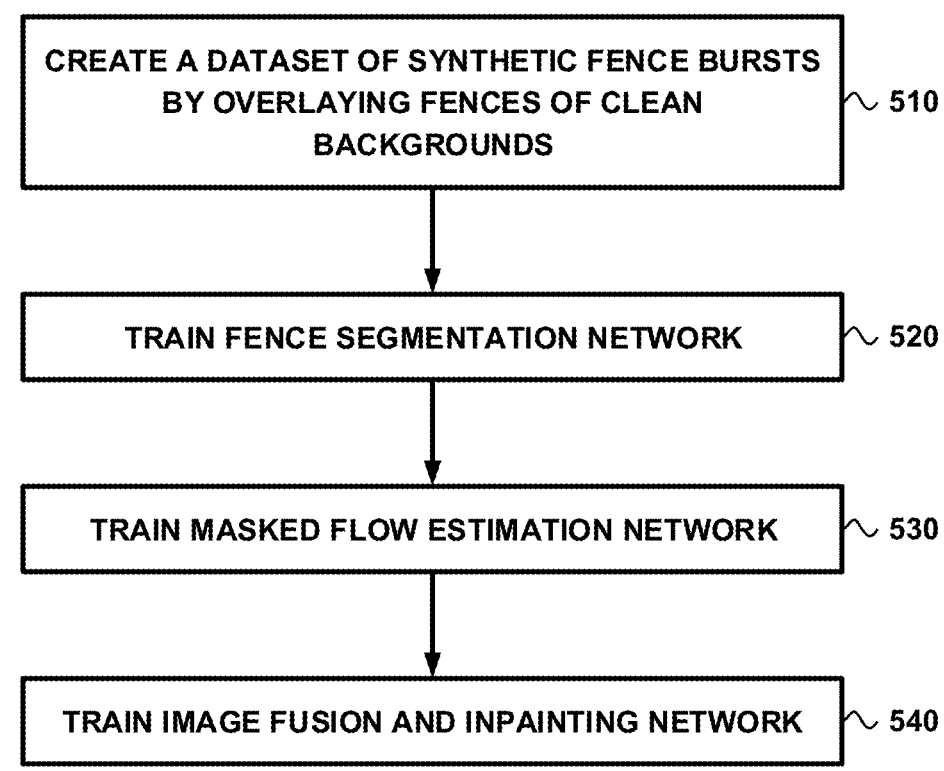
FIG. 5 illustrates an example of a process flow for training a multi-frame de-fencing model, in accordance with various aspects of the present disclosure.

Having discussed an example block diagram 300 that may be used to perform multi-frame de-fencing by a device, FIGS. 4 and 5 illustrate example process flows that may be used with the block diagram 300 to perform multi-frame de-fencing by a device during test time and to train the block diagram 300, respectively.

FIG. 4 depicts an example of a process flow for performing multi-frame de-fencing by a device during test time, in accordance with various aspects of the present disclosure.

Referring to FIG. 4, a flowchart of an example method 400 for performing multi-frame de-fencing by a device that implements one or more aspects of the disclosure is illustrated. In some embodiments, at least a portion of the method 400 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the method 400.

The method 400 depicted in FIG. 4 is similar in many respects to the block diagram 300 described above with reference to FIG. 3, and may be used to implement the multi-frame de-fencing process 200 described with reference to FIG. 2, and may include additional features not mentioned above.

At block 410 of FIG. 4, the method 400 may include the user encountering a scene of interest behind an occluding fence. For example, the user may wish to take a photo and/or video of an animal through a zoo fence, a pet bird in its cage, and/or people playing basketball in a fenced-out outdoor court.

At block 420 of FIG. 4, the method 400 may include the user capturing K images, or a short video from which K frames are extracted at regular intervals, while moving the camera slightly. That is, the user may capture an input image burst 310 that may have K images, where K is an integer greater than 1 (e.g., 5 frames). At least one image of the input image burst 310 may have at least one portion of a background scene obstructed by an opaque obstruction. The opaque obstruction may include a structure having a thickness that is less than a predetermined thickness threshold. Alternatively or additionally, the structure may have a repeating pattern across the at least one image of the input image burst 310. That is, the structure may be detectable on at least one image of the input image burst 310.

In some embodiments, block 410 may include obtaining the input image burst 310 when the images of the input image burst 310 have been sequentially captured, by an image capturing apparatus (not shown), during a predetermined time period. In optional or additional embodiments, block 410 may include extracting the input image burst 310 from a video captured, by a video capturing apparatus (not shown), during the predetermined time period.

In some embodiments, the middle frame of the input image burst 310 may be selected as a reference frame (e.g., keyframe). In optional or additional embodiments, the first image in the input image burst 310 may be selected as the keyframe image. In other optional or additional embodiments, the last image in the input image burst 310 may be selected as the keyframe image. In other optional or additional embodiments, a random (e.g., arbitrary) image in the input image burst 310 may be selected as the keyframe image.

At block 430 of FIG. 4, the method 400 may include applying a fence segmentation network to each frame in the input image burst 310. For example, block 430 may include providing the input image burst 310 to the fence segmentation model 322, as described above with reference to FIG. 3. In some embodiments, the fence segmentation model 322 may output K fence masks $\{S_i\}$ 325, as described in detail with reference to FIG. 6.

At block 440 of FIG. 4, the method 400 may include applying a masked optical flow estimation network between all frames and the reference frame, to recover background motion. For example, block 440 may include providing the input image burst 310 and the fence masks 325 to the segmentation-aware optical flow model 326, as described above with reference to FIG. 3. In some embodiments, the segmentation-aware optical flow model 326 may output K−1 optical flows $\{f_{kj}\}$ 327 between the keyframe $I_k$ and each remaining frame (e.g., image) $I_j$ of the input image burst $\{I_i\}$ 310, as described in detail with reference to FIGS. 7 and 8.

At block 450 of FIG. 4, the method 400 may include applying an image fusion and inpainting network to recover the background. For example, block 450 may include providing the input image burst 310, the fence masks 325, and the optical flows 327 to the image fusion and inpainting model 328 to reconstruct and/or recover the portions of the keyframe that may be occluded to yield the single keyframe background image $\hat{B}_k$ 330, as described above with reference to FIG. 3. The image fusion and inpainting model 328 is described in further detail with reference to FIG. 9.

FIG. 5 illustrates an example of a process flow for training a multi-frame de-fencing model, in accordance with various aspects of the present disclosure.

Referring to FIG. 5, a flowchart of an example method 500 for training a multi-frame de-fencing model 320 by a device that implements one or more aspects of the disclosure is illustrated. In some embodiments, at least a portion of the method 500 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the method 500.

The method 500 depicted in FIG. 5 may be used to train the multi-frame de-fencing model 320 described above with reference to FIGS. 3 and 4, that may be used to implement the multi-frame de-fencing process 200 described with reference to FIG. 2, and may include additional features not mentioned above.

At block 510 of FIG. 5, the method 500 may include creating a dataset of synthetic fence bursts by overlaying fences on clean backgrounds. That is, controlled image sequences (e.g., image bursts) may be used to create the dataset, which come with a clean background scene (without an obstruction) that may be used as ground truth during the training process. For example, the multi-frame de-fencing model 320 may create a dataset of synthetic obstructed image bursts by overlaying opaque obstructions on images of background scenes.

In some embodiments, synthetic sequences may be generated by overlaying obstruction (e.g., foreground) layers on a clean scene (e.g., background). For example, the synthetic sequences may be generated from videos depicting every day activities in realistic settings, that may include people and/or other objects in the background (e.g., from the Vimeo-90k dataset and/or another publicly-available dataset). In some embodiments, the external dataset, which may contain image sequences of K frames or more (e.g., 7), may be used as the background scenes on which fence obstructions are overlaid. The original clean frame sequences may be used as ground truth for training and/or evaluation.

In some embodiments, a variability and quantity of the synthetically generated data may be increased by creating additional image sequences from differently augmented versions of the original image sequences in the dataset. For example, additional image sequences may be created by performing and/or applying at least one data augmentation step to the original image sequences in the dataset. The data augmentation steps include, but are not limited to randomly distorting the images using a homography transformation, center cropping the images to avoid any black borders caused by the perspective distortion, randomly cropping of a window (e.g., 192×320), randomly flipping the image in the horizontal direction and/or the vertical direction.

In some embodiments, the dataset of synthetic obstructed image bursts may be created by applying one or more degrees of downscaling to the synthetic obstructed image bursts and adding the downscaled synthetic obstructed image bursts to the dataset. In optional or additional embodiments, the dataset of synthetic obstructed image bursts may be created by randomly flipping one or more of the synthetic obstructed image bursts and adding the flipped synthetic obstructed image bursts to the dataset. In other optional or additional embodiments, the dataset of synthetic obstructed image bursts may be created by randomly cropping one or more of the synthetic obstructed image bursts to a predetermined size and adding the cropped synthetic obstructed image bursts to the dataset.

At block 520 of FIG. 5, the method 500 may include training the fence segmentation network. For example, block 520 may include training the fence segmentation model 322 using foreground fence obstructions that may be sourced from a dataset including images with obstructions (e.g., a de-fencing dataset) with corresponding binary masks as ground truth for the fence segmentation. The sequences in the de-fencing dataset may be collected in various outdoors conditions and have a variable frame count per scene. The ground truth fence masks included in the de-fencing dataset may be used to mask out the fence from a given frame and overlay the fence on a clean background from other images. That is, the fence segmentation model 322 may be trained and/or configured with at least one portion of the dataset.

In some embodiments, a fence image burst of size K may be obtained by masking out the fence from a single frame and applying K random perspective distortions to the single frame. In this manner, different viewpoints and motions may be simulated in the de-fencing dataset.

Alternatively or additionally, various forms of data augmentation may be applied on a fence image before fusing it with the background scene to further increase the variability and/or quantity of fence masks available in the de-fencing dataset. For example, the types of foreground augmentation may include, but not be limited to, randomly down-sample the fence image and segmentation to create fences of different sizes and/or thicknesses, randomly window crop to focus on a specific sub-region of the fence; apply color jitter to create different fence appearances and lighting conditions, randomly distort the images using homography transformation to obtain a fence sequence of length K, center crop the images to avoid black border effects from the perspective distortion, and randomly blur the images with a Gaussian kernel, for example, to simulate defocus aberrations.

In optional or additional embodiments, the synthetic data may not fully capture the variability and differences in motion, lighting, and obstruction patterns that may be captured in scenes under realistic conditions. Therefore, additional controlled sequences may also be used for improved accuracy.

At block 530 of FIG. 5, the method 500 may include training the masked flow estimation network. For example, block 530 may include training the segmentation-aware optical flow model 326 described above with reference to FIG. 3. During training mask-conditional flow maps may be computed between synthetically generated frames of fence images overlaid on clean background frames. The mask-conditional flow maps may be compared with flow maps generated from the clean background frames as pseudo ground truth targets, as described in further detail with reference to FIG. 8. That is, the occlusion-aware optical flow model 326 may be trained and/or configured with at least one portion of the dataset and corresponding obstruction masks generated by the fence segmentation model 322.

In some embodiments, the occlusion-aware optical flow model 326 may be trained and/or configured by applying the occlusion-aware optical flow model, conditioned using the corresponding obstruction masks, to at least one portion of the dataset to compute the corresponding optical flow maps. In optional or additional embodiments, the occlusion-aware optical flow model 326 may be trained and/or configured by applying an optical flow model to corresponding images of the background scenes, which correspond to at least one portion of the dataset, to compute background optical flow maps. In other optional or additional embodiments, the occlusion-aware optical flow model 326 may be trained and/or configured by training the occlusion-aware optical flow model based on a comparison between the background optical flow maps and the corresponding optical flow maps.

At block 540 of FIG. 5, the method 500 may include training the image fusion and inpainting network. For example, block 530 may include training the image fusion and inpainting model 328 described above with reference to FIG. 3. In some embodiments, the image fusion and inpainting model 328 may be trained in a supervised fashion using an $L_1$ loss and a clean background image as the ground truth, as described in further detail with reference to FIG. 9. That is, the image fusion and inpainting network 328 may be trained and/or configured with the at least one portion of the dataset, the corresponding obstruction masks generated by the fence segmentation model 322, and corresponding optical flow maps computed by the occlusion-aware optical flow model 326.

The number and arrangement of blocks shown in FIG. 5 are provided as an example. In practice, there may be additional blocks, fewer blocks, different blocks, or differently arranged blocks than those shown in FIG. 5. Furthermore, two or more blocks shown in FIG. 5 may be implemented within a single block, or a single block shown in FIG. 5 may be implemented as multiple blocks. Alternatively or additionally, the blocks shown in FIG. 5 may be performed separately rather than sequentially.

Figure 6:
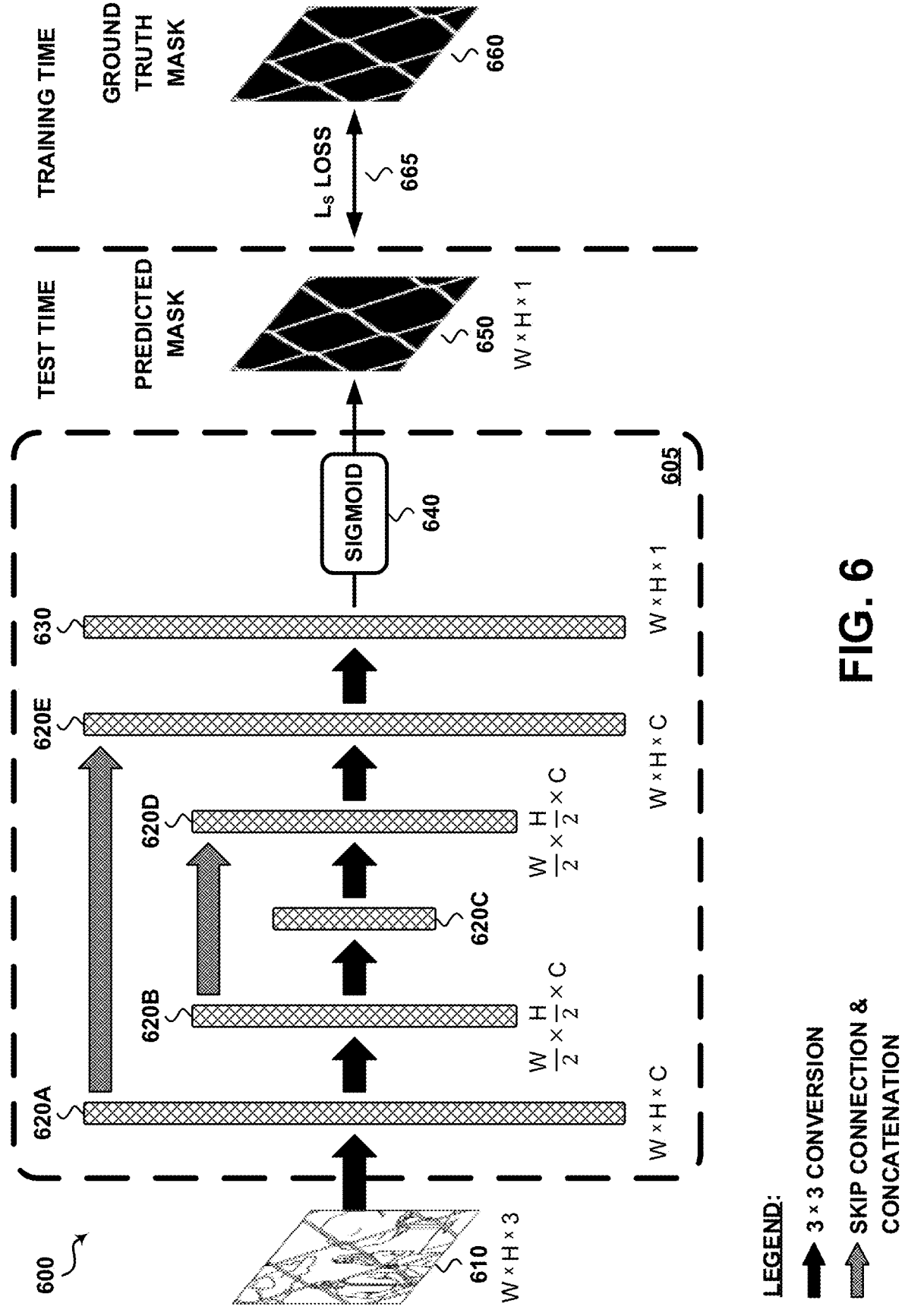
FIG. 6 illustrates an example of a block diagram of a fence segmentation stage, in accordance with various aspects of the present disclosure.

FIG. 6 illustrates an example of a block diagram of a fence segmentation stage, in accordance with various aspects of the present disclosure.

Referring to FIG. 6, a block diagram 600 of a fence segmentation stage 605 that implements one or more aspects of the disclosure is illustrated. In some embodiments, at least a portion of the block diagram 600 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the block diagram 600.

The fence segmentation stage 605 depicted by the block diagram 600 may include or may be similar in many respects to at least one of the fence segmentation model 322 of FIG. 3 and the fence segmentation network of FIG. 4, and may include additional features not mentioned above.

The fence segmentation stage 605 may be configured to receive as input a single input image 610 (e.g., RGB frame) that may include a fence obstruction. For example, the single input image 610 may be one of the images in the input image burst 310, as described with reference to FIGS. 3 and 4. The fence segmentation stage 605 may be further configured to output a fence segmentation mask 650. For example, the fence segmentation mask 650 may be one of the masks in the fence masks 325, as described with reference to FIGS. 3 and 4.

In some embodiments, the fence segmentation stage 605 may include a convolutional neural network (CNN) such as, but not limited to, a U-Net architecture, as shown in FIG. 6. For example, the U-Net backbone may comprise a down-sampling (e.g., contracting) path (e.g., 620A, 620B, 620C) and an up-sampling (e.g., expanding) path (e.g., 620D, 620E).

The down-sampling path may follow a typical architecture of a convolutional network. That is, the down-sampling path may consist of the repeated application of two 3×3 convolutions (e.g., unpadded convolutions), each followed by a rectified linear unit (ReLU) and a 2×2 max pooling operation with stride 2 for down-sampling (not shown). At each down-sampling step (e.g., 620A, 620B), the spatial dimensions of the feature map may be reduced (e.g., halved). For example, the down-sampling step 620A may down-sample a feature map having a spatial dimension and feature channel count of W×H×C to an image having a reduced spatial dimension of $$\frac{W}{2} \times \frac{H}{2} \times C,$$

that may then be provided to down-sampling step 620B. Alternatively or additionally, the number of feature channels (e.g., C) may be increased (e.g., doubled) at each down-sampling step (e.g., 620A, 620B).

The up-sampling path (e.g., 620D, 620E), may consist of an up-sampling of the feature map followed by a 2×2 convolution (e.g., up-convolution) that may decrease (e.g., halve) the number of feature channels, a concatenation with the correspondingly cropped feature map from the down-sampling path, and two 3×3 convolutions, each followed by a ReLU. In some embodiments, cropping may be necessary due to the loss of border pixels in every convolution. At the final layer 630, a 1×1 convolution may be used to map each component feature vector to the desired output logits. An activation function, such as, but not limited to, a sigmoid function 640, may be applied to the output logits from the final layer 630 in order to obtain segmentation scores in the [0, 1] range. That is, the output of the sigmoid function 640 may be the fence segmentation mask 650 having the same spatial dimensions (e.g., W×H) as the single input image 610, and having one feature channel, in which one value (e.g., '0') may represent a pixel location that is occluded by the fence obstruction, and another value (e.g., '1') may represent a pixel location of the background scene.

In some embodiments, the fence segmentation stage 605 may be trained on augmented fence data, as described above with reference to FIG. 5, using a binary cross entropy loss and an ADAM optimization algorithm. For example, a $L_s$ loss between the fence segmentation mask 650 and a ground truth mask 660 may be optimized (e.g., minimized) by using the ADAM optimization algorithm. The $L_s$ loss may be determined using a binary cross entropy loss function similar to Equation 2.

$$L_s = -\frac{1}{N} \sum_{i=1}^{N} y_i \times \log(p(y_i)) + (1 - y_i) \times \log(1 - p(y_i)) \qquad \text{[Eq. 2]}$$

Referring to Equation 2, $y_i$ represents a value of a pixel location of the fence segmentation mask 650, where $y_i \in [0, 1]$, $p(y_i)$ represents a probability for the value at the pixel location, N is a number of pixels in the fence segmentation mask 650.

Although the fence segmentation stage 605 depicted in FIG. 6 comprises a total of 5 convolutional layers (e.g., 620A-620E), it is to be understood that the present disclosure is not limited in this regard. That is, the fence segmentation stage 605 may comprise fewer convolutional layers or more convolutional layers than those depicted in FIG. 6. For example, in some embodiments, the fence segmentation stage 605 may comprise a total of 23 convolutional layers.

Although the fence segmentation stage 605 depicted in FIG. 6 mostly concentrates on one particular type of obstruction (e.g., fences) because of its commonness, the fence segmentation stage 605 may be configured and/or trained to generate obstruction masks for other types of opaque obstructions. The present disclosure is not limited in this regard. That is, the fence segmentation stage 605 may be configured and/or trained to focus on other types of opaque obstructions. For example, the fence segmentation stage 605 may output segmentation masks that correspond to other types of obstructions, such as, but not limited to, specific object types, other repeated obstruction patterns, that may be used to mask the input images and to hallucinate the obstructed portions of the background scene.

Figure 7:
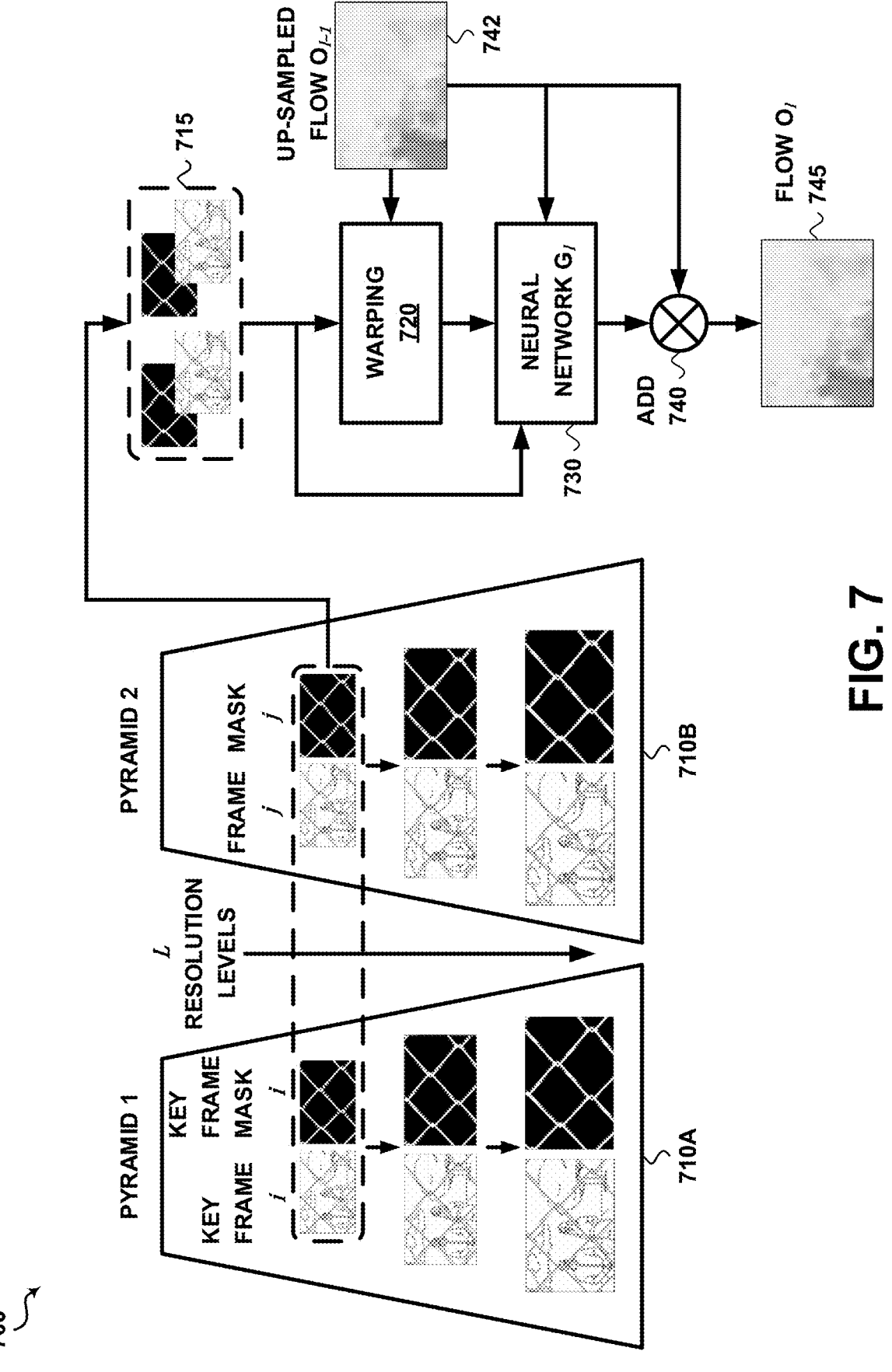
FIG. 7 depicts an example of a block diagram of a masked flow computation stage during test time, in accordance with various aspects of the present disclosure.

FIG. 7 depicts an example of a block diagram of a masked flow computation stage during test time, in accordance with various aspects of the present disclosure.

Referring to FIG. 7, a masked flow computation stage 700 that implements one or more aspects of the disclosure is illustrated. In some embodiments, at least a portion of the masked flow computation stage 700 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the masked flow computation stage 700.

The masked flow computation stage 700 depicted by FIG. 7 may include or may be similar in many respects to at least one of the segmentation-aware optical flow model 326 of FIG. 3 and the masked optical flow estimation network of FIG. 4, and may include additional features not mentioned above.

Related optical flow networks may typically be used to compute the optical flow of the background scene of a plurality of images. Such approaches may combine a spatial-pyramid formulation with deep learning. For example, related optical flow networks, such as, but not limited to, FlowNet and spatial pyramid network (SPyNet), may estimate large motions in a coarse-to-fine approach by warping at least one image of a pair at each pyramid level by the current flow estimate and compute an update to the residual flow $O_i$ 745 based on the estimate at the current pyramid level.

As shown in FIG. 7, the masked flow computation stage 700 may comprise two pyramids (e.g., 710A and 710B, hereinafter "710" generally). The pyramids 710 may be populated with L resolution levels of an image pair for computing the optical flow between the two images of the image pair. For example, pyramid 710A may be populated with L resolution levels of a selected keyframe image of the input image burst 310 and pyramid 710B may be populated with L resolution levels of a remaining image of the input image burst 310. The L resolution levels may begin at a smallest image using a lowest resolution and be up-sampled until a largest image using a highest resolution is reached. In some embodiments, the largest image using the highest resolution may match the spatial dimensions and/or resolution of the images in the input image burst 310.

Although the pyramids 710 depicted in FIG. 7 comprises a total of 3 resolution levels (e.g., L=3), it is to be understood that the present disclosure is not limited in this regard. That is, the pyramids 710 may comprise less resolution levels or more resolution levels than those depicted in FIG. 7. For example, in some embodiments, the pyramids 710 may comprise a total of 5 levels (e.g., L=5).

Continuing to refer to FIG. 7, the neural network $G_i$ 730 may iterate through the L resolution levels. That is, at each resolution level, the neural network $G_i$ 730 may compute and/or update the residual flow $O_i$ 745 using the up-sampled flow 742 from the previous resolution level and the frame pair 715 of the current resolution level. In some embodiments, the second frame of the frame pair 715 may be warped using the warping component 720 before feeding the frame pair 715 to the neural network $G_i$ 730. The computation of the residual flow $O_i$ 745 may be repeated until the residual flow $O_i$ 745 at the highest resolution is obtained. That is to say, at each pyramid resolution level, the neural network $G_i$ 730 may compute a residual flow which propagates to each of the next lower levels of the pyramid in turn, to finally obtain the residual flow $O_i$ 745 at the highest resolution.

While the related optical flow network architecture described above may typically be used to compute optical flows, these related optical flow network architectures may not typically perform well (e.g., produce noisy results) when the input images comprise repeated occlusion patterns as discussed in the present disclosure. In order to avoid artifacts caused by the repeated occlusion pattern, aspects of the present disclosure provide for a computationally light optical flow network, such as SPyNet, that has been modified to perform segmentation-aware flow computation, as shown by the masked flow computation stage 700 of FIG. 7. In some embodiments, the masked flow computation stage 700 may be referred to as "SPY$^m$".

As shown in FIG. 7, the masked flow computation stage 700 has been modified to input both the fence segmentation masks along with their corresponding input frames. The fence segmentation masks may be obtained from the fence segmentation stage 605 as described above with reference to FIG. 6. As such, the masked flow computation stage 700 may simultaneously compute and inpaint the optical flow maps corresponding to the background scene in the two images in the image pair 715, while ignoring the occlusions marked by the provided segmentation masks.

Given two input frames with fence obstructions, $\{I_i, I_j\}$ their respective fence segmentation maps, $\{S_i, S_j\}$, may be computed and passed as additional inputs to the masked flow computation stage 700 to obtain a mask-conditional flow map estimation $$f_{ij}^m.$$

The mask-conditional flow map estimation $$f_{ij}^m$$

may be determined using an equation similar to Equation 3.

$$f_{ij}^m = SPY^m([I_i, S_i], [I_j, S_j]) \qquad \text{[Eq. 3]}$$

Referring to Equation 3, [ . . . ] represents a concatenation operation along a channel dimension. For example, $\{I_i, S_i\}$ denotes a concatenation operation between input frame $I_i$ and fence segmentation map $S_i$. Since one of the input frames (e.g., $I_i$) of the masked flow computation stage 700 is the selected keyframe of the input image burst 310 and the other input frame of the pair corresponds to a remaining image of the input image burst 310, the masked flow computation stage 700 may be used to compute an optical flow map for each of the frame-keyframe pairs of the input image burst 310. Each optical flow map corresponds to the background scene of each of the frame-keyframe pairs without the foreground occlusion.

Conditioning the masked flow computation stage 700 with fence segmentation masks may allow the masked flow computation stage 700 to denote which portions of the scene correspond to the obstruction and to ignore those portions while computing background flows. As a result, the masked flow computation stage 700 may be effective in capturing motion of the background while being robust to the presence of significant fence obstructions. Segmentation-aware flow estimation may also be useful in a variety of practical settings where certain parts of a scene may need to be determined as distractions and/or sources of noise.

Figure 8:
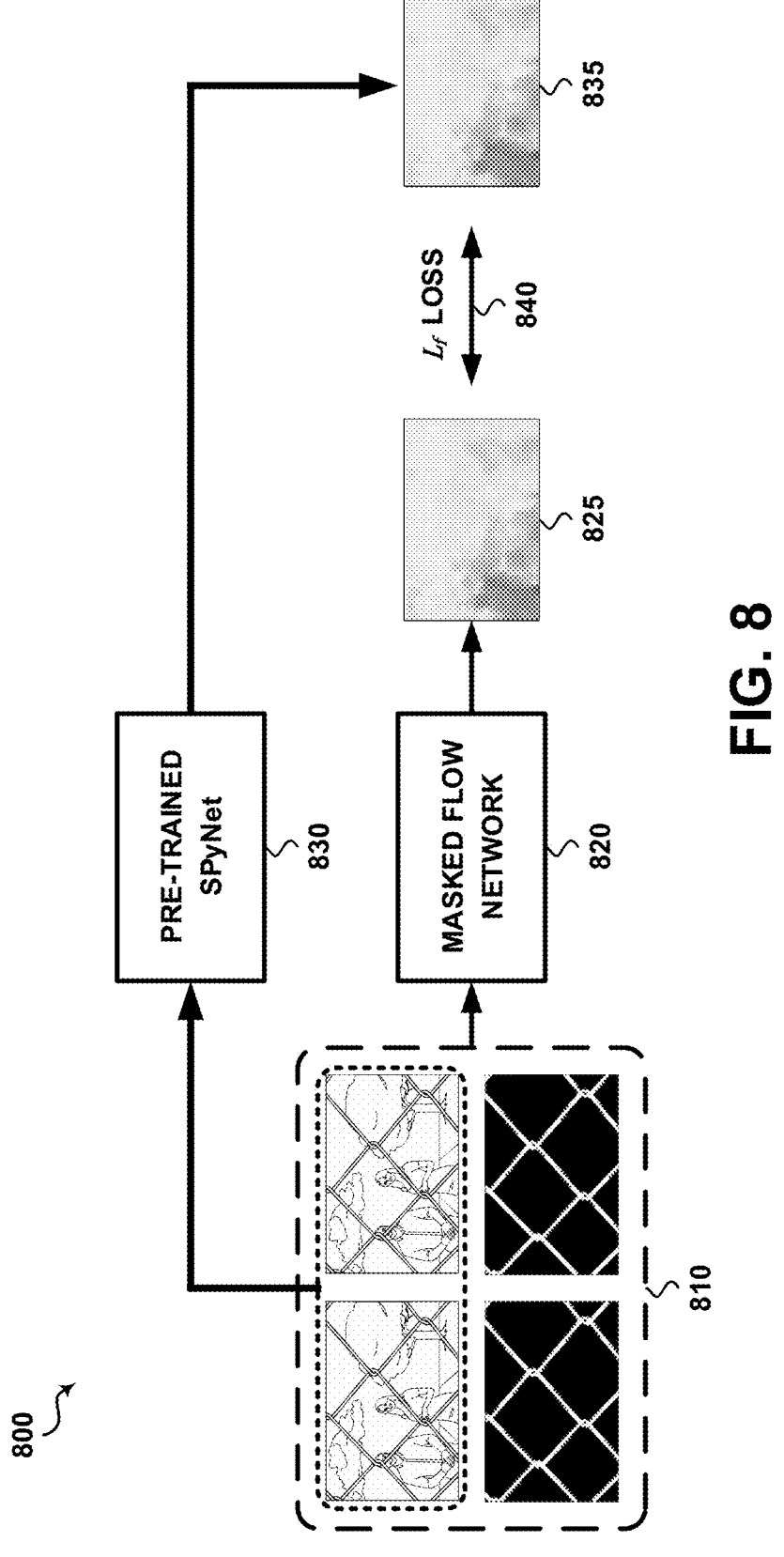
FIG. 8 illustrates an example of a block diagram of an a masked flow computation stage during training time, in accordance with various aspects of the present disclosure.

FIG. 8 illustrates an example of a block diagram of a masked flow computation stage during training time, in accordance with various aspects of the present disclosure.

Referring to FIG. 8, a block diagram 800 of a masked flow computation stage 820 during training time that implements one or more aspects of the disclosure is illustrated. In some embodiments, at least a portion of the block diagram 800 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the block diagram 800.

The masked flow computation stage 820 depicted by FIG. 8 may include or may be similar in many respects to at least one of the segmentation-aware optical flow model 326 of FIG. 3, the masked optical flow estimation network of FIG. 4, and the masked flow computation stage 700 of FIG. 7, and may include additional features not mentioned above.

As shown in FIG. 8, during training time, the masked flow computation stage 820 may be provided with synthetic data 810 constructed by overlaying obstructions (e.g., fences) on clean (unobstructed) images of background scenes, as described with reference to FIG. 5. The masked flow computation stage 820 may compute a mask-conditional flow map estimation $$f_{ij}^m$$

825, as described with reference to FIG. 7.

Continuing to refer to FIG. 8, the clean images of the background scenes (e.g., $B_i$, $B_j$, not shown) used to generate the synthetic data 810 may be provided to a pre-trained SPyNet model 830. That is, the pre-trained SPyNet model 830 may comprise an unmodified SPyNet model that has not been modified as described with reference to FIG. 7. The pre-trained SPyNet model 830 may be used to generate a pseudo ground truth optical flow 835. However, the present disclosure is not limited in this regard. That is, other models and/or procedures may be used to generate optical maps based on the clean images of the background scenes.

In some embodiments, the original pre-trained weights may be used to initialize the masked flow computation stage 820. Alternatively or additionally, the modified input layer of the masked flow computation stage 820 may be initialized with random values. During training, mask-conditional flow map estimations $$f_{ij}^m$$

825 may be computed between the synthetically generated frames overlaid on clean background frames. Consequently, the optical flow maps computed with the pre-trained SPyNet model 830 from the clean images of the background scenes may be used as pseudo ground truth targets (e.g., pseudo ground truth optical flow 835).

The $L_f$ loss 840 may be computed by comparing the pseudo ground truth optical flow 835 to the mask-conditional flow map estimation $$f_{ij}^m$$

825 generated by the masked flow computation stage 820. During training time, the masked flow computation stage 820 may be optimized to minimize the $L_f$ loss 840, which may be computed using an equation similar to Equation 4.

$$L_f = \frac{1}{2N} \sum_x \left| SPY(B_i, B_j)_{|x} - SPY^m([I_i, S_i], [I_j, S_j])_{|x} \right| \quad \text{[Eq. 4]}$$

Referring to Equation 4, N represents the number of image pixels, and x denotes the location at which evaluation is performed (e.g., loss is calculated) by averaging over 2N to account for the u (e.g., horizontal flow component) and v (e.g., vertical flow component) flow channels.

Figure 9:
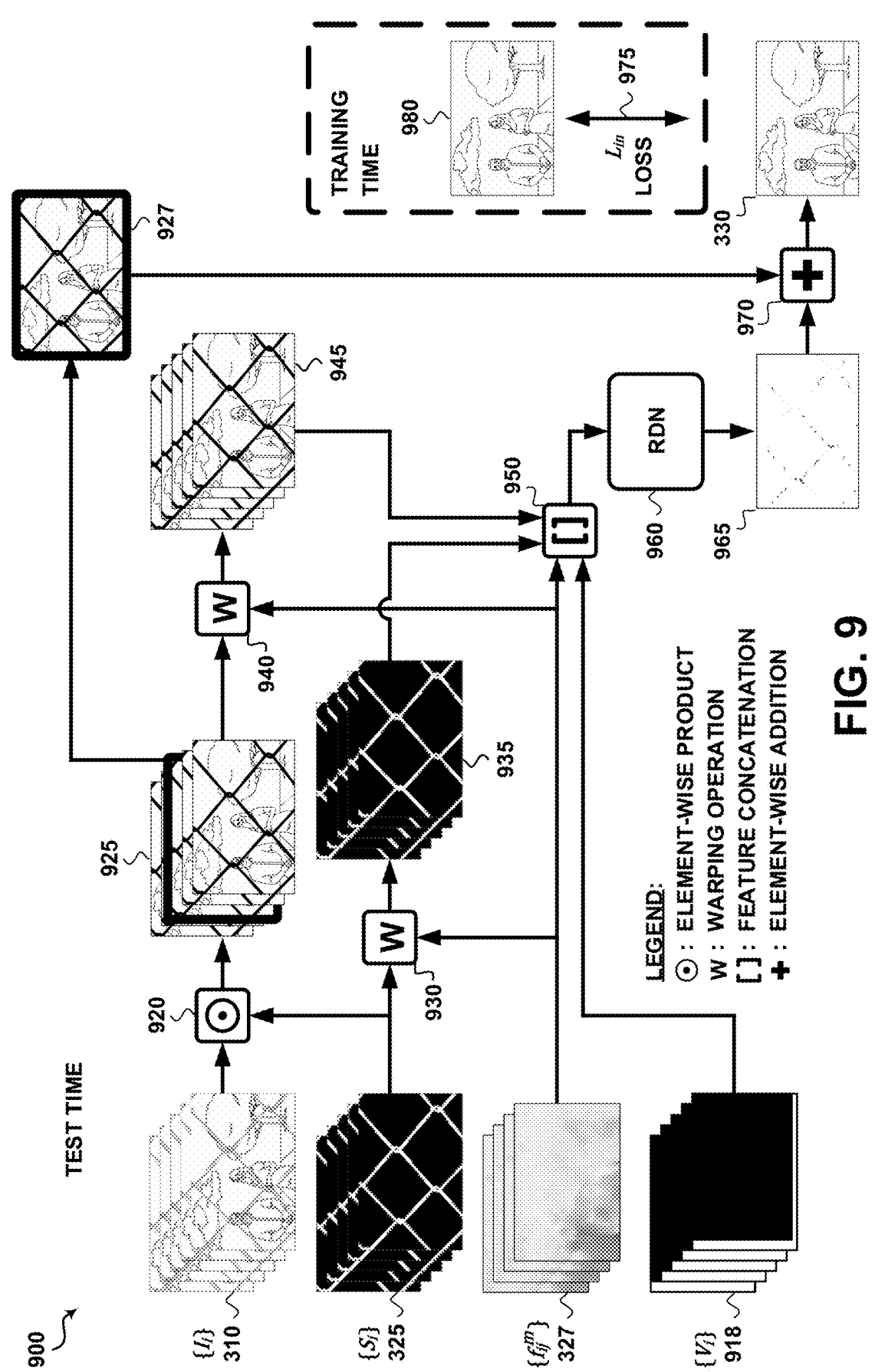
FIG. 9 depicts an example of a block diagram of an image fusion and inpainting stage, in accordance with various aspects of the present disclosure.

FIG. 9 depicts an example of a block diagram of an image fusion and inpainting stage, in accordance with various aspects of the present disclosure.

Referring to FIG. 9, an image fusion and inpainting stage 900 that implements one or more aspects of the disclosure is illustrated. In some embodiments, at least a portion of the image fusion and inpainting stage 900 may be performed by the device 100 of FIG. 1, which may include the multi-frame de-obstructing component 180. Alternatively or additionally, another computing device (e.g., a server, a laptop, a smartphone, a UE, a wearable device, etc.) that includes the multi-frame de-obstructing component 180 may perform at least a portion of the image fusion and inpainting stage 900.

The image fusion and inpainting stage 900 depicted by FIG. 9 may include or may be similar in many respects to at least one of the image fusion and inpainting model 328 of FIG. 3 and the image fusion and inpainting network of FIG. 4, and may include additional features not mentioned above.

As shown in FIG. 9, the image fusion and inpainting stage 900 may take as an input the input image burst $\{I_i\}$ 310, the occlusion (e.g., fence) masks $\{S_i\}$ 325, and the mask-conditional flow map estimation $$\{f_{ij}^m\}$$

327. The input image burst $\{I_i\}$ 310 may be obtained as described above with reference to FIGS. 2-4, and 5. The occlusion masks $\{S_i\}$ 325 may be predicted by the fence segmentation stage 605 as described above with reference to FIG. 6. The mask-conditional flow maps $$\{f_{ij}^m\}$$

327 may be computed by the masked flow computation stage 700 as described above with reference to FIGS. 7 and 8.

In some embodiments, the image fusion and inpainting stage 900 may input binary maps $\{V_i\}$ 918. Alternatively or additionally, the image fusion and inpainting stage 900 may compute binary maps $\{V_i\}$ 918 that indicate valid regions of the plurality of images 310. In optional or additional embodiments, the binary maps 918 may be dynamically generated as a by-product of the alignment process performed by the masked flow computation stage 700, for example. That is, the alignment process used in the generation of the mask-conditional flow maps 327 may map a portion of the image (e.g., a few pixels) outside of the image grid, which may be considered to be an invalid area of the image. In some embodiments, the portion of the image that is mapped outside of the image grid may be referred to as an invalid area. In some embodiments, the invalid portions of the image may be mostly located around the border of the image as such portions of the image are more likely than other portions (e.g., the center of the image) to be mapped outside of the original grid during the alignment process. The binary maps 918 may indicate the valid portions of the image (e.g., inside the image grid) with a valid value, such as, but not limited to, '1'. Alternatively or additionally, the binary maps 918 may indicate the invalid portions of the image (e.g., outside the image grid) with an invalid value, such as, but not limited to, '0'.

Continuing to refer to FIG. 9, the occlusion masks $\{S_i\}$ 325 may be used to mask out the areas that correspond to the occlusions in each frame to obtain masked frames $$I_i^m$$

925. For example, an element-wise product operation 920 may be performed on the input image burst $\{I_i\}$ 310 and the occlusion masks $\{S_i\}$ 325 to obtain the masked frames $$I_i^m$$

925 (e.g., $$I_i^m = I_i \odot S_i).$$

That is, the image fusion and inpainting stage 900 may mask out obstructed areas of the plurality of images 310 using the plurality of obstruction masks 325, resulting in masked images 925.

The masked frames $$I_i^m$$

925 may be warped with respect to the reference frame (e.g., the keyframe $I_k$) using the mask-conditional flow maps $$\{f_{ij}^m\}$$

327 to produce aligned masked frames $$\tilde{I}_i^m$$

945. For example, a warping operation 940 may be performed on the masked frames $$I_i^m$$

925 and the mask-conditional flow maps $$\{f_{ij}^m\}$$

327 to obtain the aligned masked frames $$\tilde{I}_i^m$$

945 (e.g., $$\tilde{I}_i^m = W(I_i^m, f_{ij}^m)).$$

That is, the image fusion and inpainting stage 900 may align, with respect to the selected keyframe $I_k$, the masked images 925 and the plurality of obstruction masks 325, according to the optical flow maps 327.

The occlusion masks $\{S_i\}$ 325 may be warped with respect to the reference frame (e.g., the keyframe $I_k$) using the mask-conditional flow maps $$\{f_{ij}^m\}$$

327 to produce aligned occlusion masks $\tilde{S}_i$ 935. For example, a warping operation 930 may be performed on the occlusion masks $\{S_i\}$ 325 and the mask-conditional flow maps $$\{f_{ij}^m\}$$

327 to obtain the aligned occlusion masks $\tilde{S}_i$ 935 (e.g., $$\tilde{S}_i = W(S_i, f_{ij}^m)).$$

Continuing to refer to FIG. 9, the aligned masked frames $$\tilde{I}_i^m$$

945, the aligned occlusion masks $\tilde{S}_i$ 935, the mask-conditional flow maps $$\{f_{ij}^m\}$$

327, and the binary maps $\{V_i\}$ 918 may be concatenated and passed as input to a convolutional network, such as, but not limited to, a residual dense network (RDN) 960. For example, a feature concatenation operation 950 may be performed on the aligned masked frames $$\tilde{I}_i^m$$

945, the aligned occlusion masks $\tilde{S}_i$ 935, the mask-conditional flow maps $$\{f_{ij}^m\}$$

327, and the binary maps $\{V_i\}$ 918 to obtain a feature input $f_{in}$ (not shown) that may be passed as input to the RDN 960 (e.g., $$f_{in} = [\tilde{I}_i^m, \tilde{S}_i, f_{ij}^m, V_i]).$$

That is, the image fusion and inpainting stage 900 may concatenate the aligned masked images 945, the aligned plurality of obstruction masks 935, the optical flow maps 327, and the binary masks 918, resulting in the combination of the features provided to the RDN 960.

The RDN 960 may be configured and/or trained to output a residual mask image $\tilde{S}_k$ 965 that may be used to complete the missing (e.g., occluded) areas of the keyframe. That is, the RDN 960 may be configured to hallucinate only the missing portions of the keyframe rather than to reconstruct the keyframe as a whole.

The residual mask image $\tilde{S}_k$ 965 generated by the RDN 960 may be added to the masked keyframe $$I_k^m$$

927 to obtain the single keyframe background image $\tilde{B}_k$ 330, which may constitute a final output of the multi-frame de-fencing model 320 as described above with reference to FIGS. 2-4. In some embodiments, the masked keyframe $$I_k^m$$

927 may be obtained via a skip connection between the masked keyframe $$I_k^m$$

927 and the output of the RDN 960. For example, an element-wise addition operation 970 may be performed on the residual mask image $\tilde{S}_k$ 965 and the masked keyframe $$I_k^m$$

927 to obtain the single keyframe background image $\tilde{B}_k$ 330 (e.g., $$\tilde{B}_k = \tilde{S}_k + I_k^m).$$

As shown in FIG. 9, during training time, the RDN 960 may be trained in a supervised manner using a $L_{in}$ loss 975 equation similar to Equation 5 to compare the residual mask image $\tilde{S}_k$ 965 outputted by the RDN 960 with a clean background image $B_k$ 980.

$$L_{in} = \frac{1}{N}\sum_x \left| B_{k|x} - \left( I_k^m + RDN([\tilde{I}_i^m, \tilde{S}_i, f_{ij}^m, V_i]) \right)_{|x} \right| \qquad \text{[Eq. 5]}$$

As discussed above, related learning-based approaches for obstruction removal in images may be impractical for use in low-powered devices (e.g., mobile devices) as these related approaches may require significantly large convolutional network architectures configured to reconstruct the occluded images. In some cases, the related approaches may require additional processing to perform the removal processing under real-time conditions (e.g., real data, short processing times) with an adequate level of performance (e.g., accuracy). Alternatively or additionally, some related approaches may utilize a CNN module to reconstruct the entire image, which may introduce inconsistencies and/or artifacts into the results (e.g., e.g., produce noisy results).

Advantageously, according to aspects of the present disclosure, a multi-frame de-fencing model is provided that uses the input image burst to dynamically generate segmentation masks without assuming the shape, type, or location of the occlusions on the input image burst. Furthermore, the multi-frame de-fencing model estimates flows corresponding to the background scene in the input image burst despite severe obstructions by omitting the obstructions from the flow estimation. In addition, the multi-frame de-fencing model computes a residual mask image that comprises only the pixel values for the occluded areas of a keyframe. As such, results provided by the multi-frame de-fencing model tend to look more plausible than related approaches because the pixel values are taken from real frames rather than being hallucinated by a generative network. Consequently, a less powerful and complicated network may be used, thereby reducing computational requirements (e.g., processing time, memory footprint) when compared to related approaches.

Figure 10:
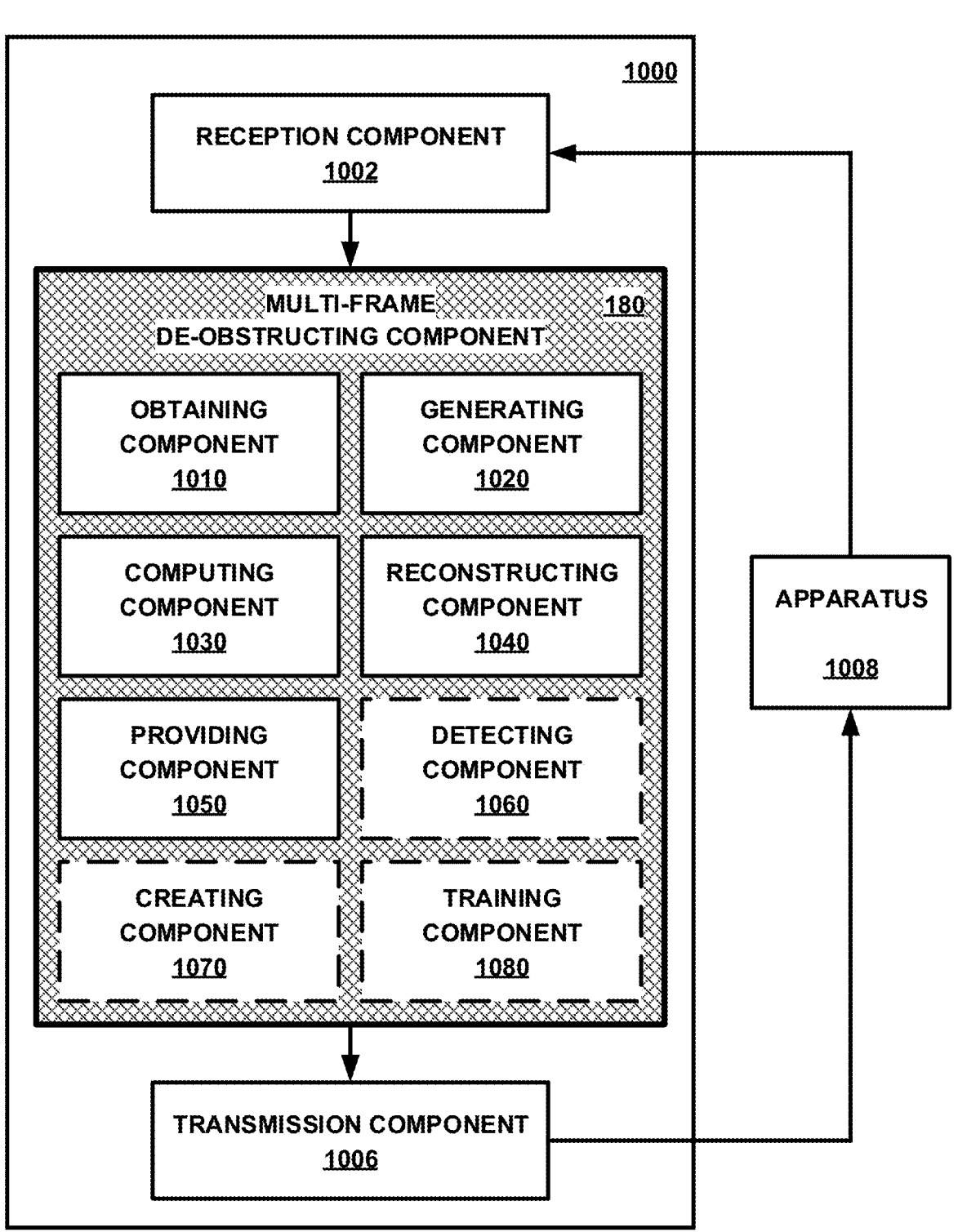
FIG. 10 illustrates a block diagram of an example apparatus for performing multi-frame de-fencing by a device, in accordance with various aspects of the present disclosure.

FIG. 10 illustrates a block diagram of an example apparatus 1000 performing multi-frame de-fencing by a device, in accordance with various aspects of the present disclosure. The apparatus 1000 may be a computing device (e.g., device 100 of FIG. 1) and/or a computing device may comprise the apparatus 1000. In some embodiments, the apparatus 1000 may comprise a reception component 1002 configured to receive communications (e.g., wired, wireless) from another apparatus (e.g., apparatus 1008), a multi-frame de-obstructing component 180 configured to perform multi-frame de-fencing, and a transmission component 1006 configured to transmit communications (e.g., wired, wireless) to another apparatus (e.g., apparatus 1008). The components of the apparatus 1000 may be in communication with one another (e.g., via one or more buses or electrical connections). As shown in FIG. 10, the apparatus 1000 may be in communication with another apparatus 1008 (such as a database, a server, a wearable device, or another computing device) using the reception component 1002 and/or the transmission component 1006.

In some embodiments, the apparatus 1000 may be configured to perform one or more operations described herein in connection with FIGS. 1-9. Alternatively or additionally, the apparatus 1000 may be configured to perform one or more processes described herein, such as method 1100 of FIGS. 11A and 11B. In some embodiments, the apparatus 1000 may comprise one or more components of the device 100 described above in connection with FIG. 1.

The reception component 1002 may receive communications, such as control information, data communications, or a combination thereof, from the apparatus 1008 (e.g., a database, a server, a wearable device, or another computing device). The reception component 1002 may provide received communications to one or more other components of the apparatus 1000, such as the multi-frame de-obstructing component 180. In some embodiments, the reception component 1002 may perform signal processing on the received communications, and may provide the processed signals to the one or more other components. In some embodiments, the reception component 1002 may comprise one or more antennas, a receive processor, a controller/processor, a memory, or a combination thereof, of the device 100 described above with reference to FIG. 1.

The transmission component 1006 may transmit communications, such as control information, data communications, or a combination thereof, to the apparatus 1008 (e.g., a database, a server, a wearable device, or another computing device). In some embodiments, the multi-frame de-obstructing component 180 may generate communications and may transmit the generated communications to the transmission component 1006 for transmission to the apparatus 1008. In some embodiments, the transmission component 1006 may perform signal processing on the generated communications, and may transmit the processed signals to the apparatus 1008. In other embodiments, the transmission component 1006 may comprise one or more antennas, a transmit processor, a controller/processor, a memory, or a combination thereof, of the device 100 described above with reference to FIG. 1. In some embodiments, the transmission component 1006 may be co-located with the reception component 1002 such as in a transceiver and/or a transceiver component.

The multi-frame de-obstructing component 180 may be configured to perform multi-frame de-fencing. In some embodiments, the multi-frame de-obstructing component 180 may include a set of components, such as an obtaining component 1010 configured to obtain an image burst, a generating component 1020 configured to generate a plurality of obstruction masks, a computing component 1030 configured to compute a motion of the background scene, a reconstructing component 1040 configured to reconstruct the selected keyframe, and a providing component 1050 configured to provide the reconstructed keyframe to the user.

Alternatively or additionally, the multi-frame de-obstructing component 180 may further include a detecting component 1060 configured to detect the opaque obstruction on at least one image of the image burst, a creating component 1070 configured to create a dataset of synthetic obstructed image bursts, and a training component 1080 configured to train the obstruction segmentation model, the occlusion-aware optical flow model, and the image fusion and inpainting network.

In some embodiments, the set of components may be separate and distinct from the multi-frame de-obstructing component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIGS. 1 and 10.

Referring to FIGS. 11A and 11B, in operation, an apparatus 1000 may perform a method 1100 of performing multi-frame de-fencing by a device. The method 1100 may be performed by the device 100 (which may include the processor 120, the memory 130, and the storage component 140, and which may be the entire device 100 and/or include one or more components of the device 100, such as the input component 150, the output component 160, the communication interface 170, and/or the multi-frame de-obstructing component 180) and/or the apparatus 1000. The method 1100 may be performed by the device 100, the apparatus 1000, and/or the multi-frame de-obstructing component 180 in communication with the apparatus 1008 (e.g., a database, a server, a wearable device, or another computing device).

At block 1110 of FIG. 11A, the method 1100 may include obtaining, from a user of the device, an image burst comprising a plurality of images, wherein each image of the plurality of images has at least one portion of a background scene obstructed by an opaque obstruction. For example, in an aspect, the device 100, the multi-frame de-obstructing component 180, and/or the obtaining component 1010 may be configured to or may comprise means for obtaining, from a user of the device, an image burst 310 comprising a plurality of images, wherein each image of the plurality of images has at least one portion of a background scene obstructed by an opaque obstruction.

For example, the obtaining at block 1110 may include the user capturing K images, or a short video from which K frames are extracted at regular intervals, while involuntarily and/or voluntarily moving the camera slightly, as described above with reference to block 420 of FIG. 420.

In some embodiments, the obtaining at block 1110 may include obtaining the plurality of images having been sequentially captured, by an image capturing apparatus, during a predetermined time period. The image capturing apparatus may have been moved by the user during the predetermined time period.

In optional or additional embodiments, the obtaining at block 1110 may include extracting the plurality of images from a video captured, by a video capturing apparatus, during a predetermined time period. The video capturing apparatus may have been moved by the user during the predetermined time period.

Further, for example, the obtaining at block 1110 may be performed to obtain an obstructed reference image (e.g., keyframe) that may need to be reconstructed and additional images that may be used in the de-fencing process.

At block 1120 of FIG. 11A, the method 1100 may include generating, for each image of the image burst, an obstruction mask corresponding to that image by applying an obstruction segmentation model to that image, resulting in a plurality of obstruction masks corresponding to the plurality of images, the plurality of obstruction masks marking the at least one portion of the background scene obstructed by the opaque obstruction in the plurality of images. For example, in an aspect, the device 100, the multi-frame de-obstructing component 180, and/or the generating component 1020 may be configured to or may comprise means for generating, for each image 610 of the image burst 310, an obstruction mask 650 corresponding to that image by applying an obstruction segmentation model 605 to that image, resulting in a plurality of obstruction masks 325 corresponding to the plurality of images 310, the plurality of obstruction masks 325 marking the at least one portion of the background scene obstructed by the opaque obstruction in the plurality of images 310.

For example, the generating at block 1120 may include dynamically generating the plurality of obstruction masks 325 corresponding to the plurality of images 310, as described above with reference to FIG. 6.

In some embodiments, the generating at block 1120 may include performing, using the obstruction segmentation model 605, one or more down-sampling operations on that image of the image burst resulting in a down-sampled image. Each of the one or more down-sampling operations may successively reduce a number of pixels of that image and may increase a number of feature channels of that image.

In optional or additional embodiments, the generating at block 1120 may include performing, using the obstruction segmentation model 605, one or more up-sampling operations on the down-sampled image resulting in an output image. Each of the one or more up-sampling operations may successively increase a number of pixels of the down-sampled image and may decrease a number of feature channels of the down-sampled image.

In optional or additional embodiments, the generating at block 1120 may include generating the obstruction mask 650 for that image of the image burst 310 by applying sigmoid function 640 to the output image of the obstruction segmentation model 605.

At block 1130 of FIG. 11A, the method 1100 may include computing a motion of the background scene, with respect to a keyframe selected from the plurality of images, by applying an occlusion-aware optical flow model, conditioned using the plurality of obstruction masks, to frame-keyframe pairs of the image burst, each pair of the frame-keyframe pairs comprising the keyframe and a remaining image of the plurality of images. For example, in an aspect, the device 100, the multi-frame de-obstructing component 180, and/or the computing component 1030 may be configured to or may comprise means for computing a motion of the background scene, with respect to a keyframe selected from the plurality of images 310, by applying an occlusion-aware optical flow model 326, conditioned using the plurality of obstruction masks 325, to frame-keyframe pairs of the image burst, each pair 715 of the frame-keyframe pairs comprising the keyframe and a remaining image of the plurality of images.

For example, the computing at block 1130 may include computing the optical flow of the background scene of the keyframe image, without the obstruction, with respect to a remaining image of the image burst 310, as described above with reference to FIG. 7.

In some embodiments, the computing at block 1130 may include computing, using the occlusion-aware optical flow model 326, an optical flow map 745 for each of the frame-keyframe pairs. Each optical flow map 745 may correspond to the background scene of each of the frame-keyframe pairs.

At block 1140 of FIG. 11B, the method 1100 may include reconstructing the selected keyframe by providing a combination of features to an image fusion and inpainting network, the features comprising the plurality of images and the plurality of obstruction masks aligned according to the motion of the background scene, optical flow maps generated by the occlusion-aware optical flow model, and binary masks indicating valid regions of the plurality of images. For example, in an aspect, the device 100, the multi-frame de-obstructing component 180, and/or the reconstructing component 1040 may be configured to or may comprise means for reconstructing the selected keyframe 927 by providing a combination of features to an image fusion and inpainting network 960, the features comprising the plurality of images 310 and the plurality of obstruction masks 325 aligned according to the motion of the background scene, optical flow maps 327 generated by the occlusion-aware optical flow model 326, and binary masks indicating valid regions of the plurality of images 310.

For example, the reconstructing at block 1140 may include combining the selected keyframe 927 with a residual mask image 965 to obtain the single keyframe background image 330, as described above with reference to FIG. 9.

In some embodiments, the reconstructing at block 1140 may include masking out obstructed areas of the plurality of images using the plurality of obstruction masks, resulting in masked images.

In optional or additional embodiments, the reconstructing at block 1140 may include aligning, with respect to the selected keyframe, the masked images and the plurality of obstruction masks, according to the optical flow maps.

In optional or additional embodiments, the reconstructing at block 1140 may include computing the binary masks indicating the valid regions of the plurality of images.

In optional or additional embodiments, the reconstructing at block 1140 may include concatenating the aligned masked images, the aligned plurality of obstruction masks, the optical flow maps, and the binary masks, resulting in the combination of the features provided to the image fusion and inpainting network.

At block 1150 of FIG. 11B, the method 1100 may include providing, to the user, the reconstructed keyframe comprising an unobstructed version of the background scene of the image burst. For example, in an aspect, the device 100, the multi-frame de-obstructing component 180, and/or the providing component 1050 may be configured to or may comprise means for providing, to the user, the reconstructed keyframe 330 comprising an unobstructed version of the background scene of the image burst 310.

In another optional or additional aspect that may be combined with any other aspect, the method 1100 may further include detecting the opaque obstruction on at least one image of the image burst, wherein the opaque obstruction comprises a structure having a thickness less than a predetermined threshold. For example, in an aspect, the device 100, the multi-frame de-obstructing component 180, and/or the detecting component 1060 may be configured to or may comprise means for detecting the opaque obstruction on at least one image of the image burst, wherein the opaque obstruction comprises a structure having a thickness less than a predetermined threshold.

For example, in some embodiments, the structure of the opaque obstruction may have a repeating pattern across the at least one image of the image burst.

Continuing to refer to FIGS. 11A and 11B, in another optional or additional aspect that may be combined with any other aspect, the method 1100 may further include creating a dataset of synthetic obstructed image bursts by overlaying opaque obstructions on images of background scenes. For example, in an aspect, the device 100, the multi-frame de-obstructing component 180, and/or the creating component 1070 may be configured to or may comprise means for creating a dataset of synthetic obstructed image bursts by overlaying opaque obstructions on images of background scenes.

For example, in some embodiments, the creating of the dataset may include applying one or more degrees of downscaling to the synthetic obstructed image bursts and adding the downscaled synthetic obstructed image bursts to the dataset.

In optional or additional embodiments, the creating of the dataset may include randomly flipping one or more of the synthetic obstructed image bursts and adding the flipped synthetic obstructed image bursts to the dataset.

In another optional or additional embodiments, the creating of the dataset may include randomly cropping one or more of the synthetic obstructed image bursts to a predetermined size and adding the cropped synthetic obstructed image bursts to the dataset.

in another optional or additional aspect that may be combined with any other aspect, the method 1100 may further include training the obstruction segmentation model with at least one portion of the dataset. For example, in an aspect, the device 100, the multi-frame de-obstructing component 180, and/or the training component 1080 may be configured to or may comprise means for training the obstruction segmentation model with at least one portion of the dataset.

in another optional or additional aspect that may be combined with any other aspect, the method 1100 may further include training the occlusion-aware optical flow model with the at least one portion of the dataset and corresponding obstruction masks generated by the obstruction segmentation model. For example, in an aspect, the device 100, the multi-frame de-obstructing component 180, and/or the training component 1080 may be configured to or may comprise means for training the occlusion-aware optical flow model with the at least one portion of the dataset and corresponding obstruction masks generated by the obstruction segmentation model.

For example, in some embodiments, the training of the occlusion-aware optical flow model may include applying the occlusion-aware optical flow model, conditioned using the corresponding obstruction masks, to the at least one portion of the dataset to compute the corresponding optical flow maps.

In optional or additional embodiments, the training of the occlusion-aware optical flow model may include applying an optical flow model to corresponding images of the background scenes, which correspond to the at least one portion of the dataset, to compute background optical flow maps.

In another optional or additional embodiments, the training of the occlusion-aware optical flow model may include training the occlusion-aware optical flow model based on a comparison between the background optical flow maps and the corresponding optical flow maps.

in another optional or additional aspect that may be combined with any other aspect, the method 1100 may further include training the image fusion and inpainting network with the at least one portion of the dataset, the corresponding obstruction masks generated by the obstruction segmentation model, and corresponding optical flow maps computed by the occlusion-aware optical flow model. For example, in an aspect, the device 100, the multi-frame de-obstructing component 180, and/or the training component 1080 may be configured to or may comprise means for training the image fusion and inpainting network with the at least one portion of the dataset, the corresponding obstruction masks generated by the obstruction segmentation model, and corresponding optical flow maps computed by the occlusion-aware optical flow model.

The following aspects are illustrative only and aspects thereof may be combined with aspects of other embodiments or teaching described herein, without limitation.

Aspect 1 is a method of performing multi-frame defencing by a device. The method includes obtaining, from a user of the device, an image burst including a plurality of images. Each image of the plurality of images has at least one portion of a background scene obstructed by an opaque obstruction. The method further includes generating, for each image of the image burst, an obstruction mask corresponding to that image by applying an obstruction segmentation model to that image, resulting in a plurality of obstruction masks corresponding to the plurality of images. The plurality of obstruction masks mark the at least one portion of the background scene obstructed by the opaque obstruction in the plurality of images. The method further includes computing a motion of the background scene, with respect to a keyframe selected from the plurality of images, by applying an occlusion-aware optical flow model, conditioned using the plurality of obstruction masks, to frame-keyframe pairs of the image burst. Each pair of the frame-keyframe pairs include the keyframe and a remaining image of the plurality of images. The method further includes reconstructing the selected keyframe by providing a combination of features to an image fusion and inpainting network. The features include the plurality of images and the plurality of obstruction masks aligned according to the motion of the background scene, optical flow maps generated by the occlusion-aware optical flow model, and binary masks indicating valid regions of the plurality of images. The method further includes providing, to the user, the reconstructed keyframe that includes an unobstructed version of the background scene of the image burst.

In Aspect 2, the method of Aspect 1, may include detecting the opaque obstruction on at least one image of the image burst. The opaque obstruction may include a structure having a thickness less than a predetermined threshold.

In Aspect 3, in the method of any of Aspects 1 or 2, the structure may have a repeating pattern across the at least one image of the image burst.

In Aspect 4, the method of any of Aspects 1 to 3 may include obtaining the plurality of images having been sequentially captured, by an image capturing apparatus, during a predetermined time period. The image capturing apparatus may have been moved by the user during the predetermined time period.

In Aspect 5, the method of any of Aspects 1 to 4 may include extracting the plurality of images from a video captured, by a video capturing apparatus, during a predetermined time period. The video capturing apparatus may have been moved by the user during the predetermined time period.

In Aspect 6, the method of any of Aspects 1 to 5 may include performing, using the obstruction segmentation model, one or more down-sampling operations on that image of the image burst resulting in a down-sampled image. Each of the one or more down-sampling operations may successively reduce a number of pixels of that image and may increase a number of feature channels of that image. The method may further include performing, using the obstruction segmentation model, one or more up-sampling operations on the down-sampled image resulting in an output image. Each of the one or more up-sampling operations may successively increase a number of pixels of the down-sampled image and may decrease a number of feature channels of the down-sampled image. The method may further include generating the obstruction mask for that image of the image burst by applying a sigmoid function to the output image of the obstruction segmentation model.

In Aspect 7, the method of any of Aspects 1 to 6 may include computing, using the occlusion-aware optical flow model, an optical flow map for each of the frame-keyframe pairs. Each optical flow map may correspond to the background scene of each of the frame-keyframe pairs.

In Aspect 8, the method of any of Aspects 1 to 7 may include masking out obstructed areas of the plurality of images using the plurality of obstruction masks, resulting in masked images. The method may further include aligning, with respect to the selected keyframe, the masked images and the plurality of obstruction masks, according to the optical flow maps. The method may further include computing the binary masks indicating the dvalid regions of the plurality of images. The method may further include concatenating the aligned masked images, the aligned plurality of obstruction masks, the optical flow maps, and the binary masks, resulting in the combination of the features provided to the image fusion and inpainting network.

In Aspect 9, the method of any of Aspects 1 to 8 may include creating a dataset of synthetic obstructed image bursts by overlaying opaque obstructions on images of background scenes. The method may further include training the obstruction segmentation model with at least one portion of the dataset. The method may further include training the occlusion-aware optical flow model with the at least one portion of the dataset and corresponding obstruction masks generated by the obstruction segmentation model. The method may further include training the image fusion and inpainting network with the at least one portion of the dataset, the corresponding obstruction masks generated by the obstruction segmentation model, and corresponding optical flow maps computed by the occlusion-aware optical flow model.

In Aspect 10, the method of any of Aspects 1 to 9 may include applying one or more degrees of downscaling to the synthetic obstructed image bursts and adding the downscaled synthetic obstructed image bursts to the dataset. The method may further include randomly flipping one or more of the synthetic obstructed image bursts and adding the flipped synthetic obstructed image bursts to the dataset. The method may further include randomly cropping one or more of the synthetic obstructed image bursts to a predetermined size and adding the cropped synthetic obstructed image bursts to the dataset.

In Aspect 11, the method of any of Aspects 1 to 10 may include applying the occlusion-aware optical flow model, conditioned using the corresponding obstruction masks, to the at least one portion of the dataset to compute the corresponding optical flow maps. The method may further include applying an optical flow model to corresponding images of the background scenes, which correspond to the at least one portion of the dataset, to compute background optical flow maps. The method may further include training the occlusion-aware optical flow model based on a comparison between the background optical flow maps and the corresponding optical flow maps.

Aspect 12 is an apparatus for performing multi-frame de-fencing by a device. The apparatus includes a memory storage storing computer-executable instructions, and a processor communicatively coupled to the memory storage. The processor is configured to execute the computer-executable instructions and cause the apparatus to perform one or more of the methods of any of Aspects 1 to 11.

Aspect 13 is an apparatus for multi-frame de-fencing to be performed by a device including means for performing one or more of the methods of any of Aspects 1 to 11.

Aspect 14 is a non-transitory computer-readable storage medium storing computer-executable instructions for performing multi-frame de-fencing by a device. The computer-executable instructions are configured, when executed by one or more processors of the device, to cause the device to perform one or more of the methods of any of Aspects 1 to 11.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 and 5-10) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc., that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of performing multi-frame de-fencing by a device, comprising:

obtaining, from a user of the device, an image burst comprising a plurality of images, wherein each image of the plurality of images has at least one portion of a background scene obstructed by an opaque obstruction;

detecting the opaque obstruction on at least one image of the image burst, the opaque obstruction comprising a structure having a thickness less than a predetermined threshold;

generating, for each image of the image burst, an obstruction mask corresponding to that image by applying an obstruction segmentation model to that image, resulting in a plurality of obstruction masks corresponding to the plurality of images, the plurality of obstruction masks marking the at least one portion of the background scene obstructed by the opaque obstruction in the plurality of images;

computing a motion of the background scene, with respect to a keyframe selected from the plurality of images, by applying an occlusion-aware optical flow model, conditioned using the plurality of obstruction masks, to frame-keyframe pairs of the image burst, each pair of the frame-keyframe pairs comprising the keyframe and a remaining image of the plurality of images;

reconstructing the selected keyframe by providing a combination of features to an image fusion and inpainting network, the features comprising the plurality of images and the plurality of obstruction masks aligned according to the motion of the background scene, optical flow maps generated by the occlusion-aware optical flow model, and binary masks indicating valid regions of the plurality of images; and providing, to the user, the reconstructed keyframe comprising an unobstructed version of the background scene of the image burst.

2. The method of claim 1, wherein the structure has a repeating pattern across the at least one image of the image burst.

3. The method of claim 1, wherein the obtaining of the image burst comprises:

obtaining the plurality of images having been sequentially captured, by an image capturing apparatus, during a predetermined time period, wherein the image capturing apparatus has been moved by the user during the predetermined time period.

4. The method of claim 1, wherein the obtaining of the image burst comprises:

extracting the plurality of images from a video captured, by a video capturing apparatus, during a predetermined time period, wherein the video capturing apparatus has been moved by the user during the predetermined time period.

5. The method of claim 1, wherein the generating, for that image of the image burst, of the obstruction mask comprises:

performing, using the obstruction segmentation model, one or more down-sampling operations on that image of the image burst resulting in a down-sampled image, wherein each of the one or more down-sampling operations successively reduce a number of pixels of that image and increase a number of feature channels of that image;

performing, using the obstruction segmentation model, one or more up-sampling operations on the down-sampled image resulting in an output image, wherein each of the one or more up-sampling operations successively increase a number of pixels of the down-sampled image and decrease a number of feature channels of the down-sampled image; and generating the obstruction mask for that image of the image burst by applying a sigmoid function to the output image of the obstruction segmentation model.

6. The method of claim 1, further comprising:

computing, using the occlusion-aware optical flow model, an optical flow map for each of the frame-keyframe pairs, each optical flow map corresponding to the background scene of each of the frame-keyframe pairs.

7. The method of claim 1, wherein the reconstructing of the selected keyframe comprises:

masking out obstructed areas of the plurality of images using the plurality of obstruction masks, resulting in masked images;

aligning, with respect to the selected keyframe, the masked images and the plurality of obstruction masks, according to the optical flow maps;

computing the binary masks indicating the valid regions of the plurality of images; and concatenating the aligned masked images, the aligned plurality of obstruction masks, the optical flow maps, and the binary masks, resulting in the combination of the features provided to the image fusion and inpainting network.

8. The method of claim 1, further comprising:

creating a dataset of synthetic obstructed image bursts by overlaying opaque obstructions on images of background scenes;

training the obstruction segmentation model with at least one portion of the dataset;

training the occlusion-aware optical flow model with the at least one portion of the dataset and corresponding obstruction masks generated by the obstruction segmentation model; and training the image fusion and inpainting network with the at least one portion of the dataset, the corresponding obstruction masks generated by the obstruction segmentation model, and corresponding optical flow maps computed by the occlusion-aware optical flow model.

9. The method of claim 8, wherein the creating of the dataset comprises:

applying one or more degrees of downscaling to the synthetic obstructed image bursts and adding the downscaled synthetic obstructed image bursts to the dataset;

randomly flipping one or more of the synthetic obstructed image bursts and adding the flipped synthetic obstructed image bursts to the dataset; and randomly cropping one or more of the synthetic obstructed image bursts to a predetermined size and adding the cropped synthetic obstructed image bursts to the dataset.

10. The method of claim 8, wherein the training of the occlusion-aware optical flow model comprises:

applying the occlusion-aware optical flow model, conditioned using the corresponding obstruction masks, to the at least one portion of the dataset to compute the corresponding optical flow maps;

applying an optical flow model to corresponding images of the background scenes, which correspond to the at least one portion of the dataset, to compute background optical flow maps; and training the occlusion-aware optical flow model based on a comparison between the background optical flow maps and the corresponding optical flow maps.

11. An apparatus for performing multi-frame de-fencing, comprising:

a memory storage storing computer-executable instructions; and a processor communicatively coupled to the memory storage, wherein the processor is configured to execute the computer-executable instructions and cause the apparatus to:

obtain, from a user of the apparatus, an image burst comprising a plurality of images, wherein each image of the plurality of images has at least one portion of a background scene obstructed by an opaque obstruction;

detect the opaque obstruction on at least one image of the image burst, the opaque obstruction comprising a structure having a thickness less than a predetermined threshold, and the structure having a repeating pattern across the at least one image of the image burst;

generate, for each image of the image burst, an obstruction mask corresponding to that image by applying an obstruction segmentation model to that image, resulting in a plurality of obstruction masks corresponding to the plurality of images, the plurality of obstruction masks marking the at least one portion of the background scene obstructed by the opaque obstruction in the plurality of images;

compute a motion of the background scene, with respect to a keyframe selected from the plurality of images, by applying an occlusion-aware optical flow model, conditioned using the plurality of obstruction masks, to frame-keyframe pairs of the image burst, each pair of the frame-keyframe pairs comprising the keyframe and a remaining image of the plurality of images;

reconstruct the selected keyframe by providing a combination of features to an image fusion and inpainting network, the features comprising the plurality of images and the plurality of obstruction masks aligned according to the motion of the background scene, optical flow maps generated by the occlusion-aware optical flow model, and binary masks indicating valid regions of the plurality of images; and provide, to the user, the reconstructed keyframe comprising an unobstructed version of the background scene of the image burst.

12. The apparatus of claim 11, wherein the processor is further configured to execute further computer-executable instructions and further cause the apparatus to:

perform, using the obstruction segmentation model, one or more down-sampling operations on that image of the image burst resulting in a down-sampled image, wherein each of the one or more down-sampling operations successively reduce a number of pixels of that image and increase a number of feature channels of that image;

perform, using the obstruction segmentation model, one or more up-sampling operations on the down-sampled image resulting in an output image, wherein each of the one or more up-sampling operations successively increase a number of pixels of the down-sampled image and decrease a number of feature channels of the down-sampled image; and generate the obstruction mask for that image of the image burst by applying a sigmoid function to the output image of the obstruction segmentation model.

13. The apparatus of claim 11, wherein the processor is further configured to execute further computer-executable instructions and further cause the apparatus to:

compute, using the occlusion-aware optical flow model, an optical flow map for each of the frame-keyframe pairs, each optical flow map corresponding to the background scene of each of the frame-keyframe pairs.

14. The apparatus of claim 11, wherein the processor is further configured to execute further computer-executable instructions and further cause the apparatus to:

mask out obstructed areas of the plurality of images using the plurality of obstruction masks, resulting in masked images;

align, with respect to the selected keyframe, the masked images and the plurality of obstruction masks, according to the optical flow maps;

compute the binary masks indicating the valid regions of the plurality of images; and concatenate the aligned masked images, the aligned plurality of obstruction masks, the optical flow maps, and the binary masks, resulting in the combination of the features provided to the image fusion and inpainting network.

15. The apparatus of claim 11, wherein the processor is further configured to execute further computer-executable instructions and further cause the apparatus to:

create a dataset of synthetic obstructed image bursts by overlaying opaque obstructions on images of background scenes;

train the obstruction segmentation model with at least one portion of the dataset;

train the occlusion-aware optical flow model with the at least one portion of the dataset and corresponding obstruction masks generated by the obstruction segmentation model; and train the image fusion and inpainting network with the at least one portion of the dataset, the corresponding obstruction masks generated by the obstruction segmentation model, and corresponding optical flow maps computed by the occlusion-aware optical flow model.

16. The apparatus of claim 15, the processor is further configured to execute further computer-executable instructions and further cause the apparatus to:

apply one or more degrees of downscaling to the synthetic obstructed image bursts and add the downscaled synthetic obstructed image bursts to the dataset;

randomly flip one or more of the synthetic obstructed image bursts and add the flipped synthetic obstructed image bursts to the dataset; and randomly crop one or more of the synthetic obstructed image bursts to a predetermined size and add the cropped synthetic obstructed image bursts to the dataset.

17. A non-transitory computer-readable storage medium storing computer-executable instructions for performing multi-frame de-fencing by a device, the computer-executable instructions being configured, when executed by one or more processors of the device, to cause the device to:

obtain, from a user of the device, an image burst comprising a plurality of images, wherein each image of the plurality of images has at least one portion of a background scene obstructed by an opaque obstruction;

detect the opaque obstruction on at least one image of the image burst, the opaque obstruction comprising a structure having a thickness less than a predetermined threshold;

generate, for each image of the image burst, an obstruction mask corresponding to that image by applying an obstruction segmentation model to that image, resulting in a plurality of obstruction masks corresponding to the plurality of images, the plurality of obstruction masks marking the at least one portion of the background scene obstructed by the opaque obstruction in the plurality of images;

compute a motion of the background scene, with respect to a keyframe selected from the plurality of images, by applying an occlusion-aware optical flow model, conditioned using the plurality of obstruction masks, to frame-keyframe pairs of the image burst, each pair of the frame-keyframe pairs comprising the keyframe and a remaining image of the plurality of images;

reconstruct the selected keyframe by providing a combination of features to an image fusion and inpainting network, the features comprising the plurality of images and the plurality of obstruction masks aligned according to the motion of the background scene, optical flow maps generated by the occlusion-aware optical flow model, and binary masks indicating valid regions of the plurality of images; and provide, to the user, the reconstructed keyframe comprising an unobstructed version of the background scene of the image burst.

18. The non-transitory computer-readable storage medium of claim 17, wherein the computer-executable instructions are further configured, when executed by one or more processors of the device, to further cause the device to:

mask out obstructed areas of the plurality of images using the plurality of obstruction masks, resulting in masked images;

align, with respect to the selected keyframe, the masked images and the plurality of obstruction masks, according to the optical flow maps;

compute the binary masks indicating the valid regions of the plurality of images; and concatenate the aligned masked images, the aligned plurality of obstruction masks, the optical flow maps, and the binary masks, resulting in the combination of the features provided to the image fusion and inpainting network.

\* \* \* \* \*